(12) United States Patent
Tsuchiya

(10) Patent No.: US 11,279,141 B2
(45) Date of Patent: Mar. 22, 2022

(54) LIQUID DISCHARGING APPARATUS, METHOD FOR DISCHARGING LIQUID AND RECORDING MEDIUM

(71) Applicant: Yuki Tsuchiya, Kanagawa (JP)

(72) Inventor: Yuki Tsuchiya, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/697,963

(22) Filed: Nov. 27, 2019

(65) Prior Publication Data

US 2020/0171837 A1 Jun. 4, 2020

(30) Foreign Application Priority Data

Nov. 30, 2018 (JP) .............................. JP2018-226137

(51) Int. Cl.
*B41J 2/175* (2006.01)
*H04N 1/40* (2006.01)
*G06K 15/10* (2006.01)
*B41J 2/145* (2006.01)

(52) U.S. Cl.
CPC ........ *B41J 2/17596* (2013.01); *G06K 15/102* (2013.01); *H04N 1/40031* (2013.01); *B41J 2/145* (2013.01)

(58) Field of Classification Search
CPC ............................ G06K 15/105; G06K 15/107
See application file for complete search history.

(56) References Cited

U.S. PATENT DOCUMENTS

| 6,963,423 | B2 | 11/2005 | Ogasahara et al. |
| 2003/0063153 | A1* | 4/2003 | Bauer ................. G06K 15/107 347/40 |
| 2007/0120883 | A1* | 5/2007 | Tsuboi ................. B41J 25/001 347/14 |

(Continued)

FOREIGN PATENT DOCUMENTS

| JP | 2002-144637 | 5/2002 |
| JP | 2011-173406 | 9/2011 |

(Continued)

OTHER PUBLICATIONS

Machine generated Ensligh translation of JP2011173406A to Takeuchi, "Recording Device and Recording Metho"; translation retrieved via https://worldwide.espacenet.com on Jan. 22, 2021; 14pp.*

*Primary Examiner* — Shelby L Fidler
(74) *Attorney, Agent, or Firm* — IPUSA, PLLC

(57) ABSTRACT

A liquid discharging apparatus includes a print head unit including a nozzle array with a plurality of nozzles in a sub-scanning direction, each nozzle being configured to discharge liquid onto a print medium. The liquid discharging apparatus includes a moving unit configured to move the print head unit in a scanning direction perpendicular to the sub-scanning direction with respect to the print medium, while causing discharge of the liquid onto the print medium. The moving unit is configured to move, without discharge of liquid, the print medium or the print head unit in the sub-scanning direction. The liquid discharging apparatus includes a line-pitch setting unit configured to set a line pitch by which the print head unit moves, per scan with respect to the sub-scanning direction.

9 Claims, 21 Drawing Sheets

(56) References Cited

U.S. PATENT DOCUMENTS

| | | | |
|---|---|---|---|
| 2010/0033526 A1* | 2/2010 | Toda | B41J 2/2132 |
| | | | 347/12 |
| 2010/0118318 A1* | 5/2010 | Fuse | G06K 15/107 |
| | | | 358/1.8 |
| 2015/0251410 A1* | 9/2015 | Matsumura | B41J 2/04501 |
| | | | 347/9 |
| 2016/0243821 A1* | 8/2016 | Yoshida | B41J 2/2132 |
| 2019/0270316 A1 | 9/2019 | Tsuchiya | |

FOREIGN PATENT DOCUMENTS

| | | |
|---|---|---|
| JP | 2012-187859 | 10/2012 |
| JP | 2014-139005 | 7/2014 |

* cited by examiner

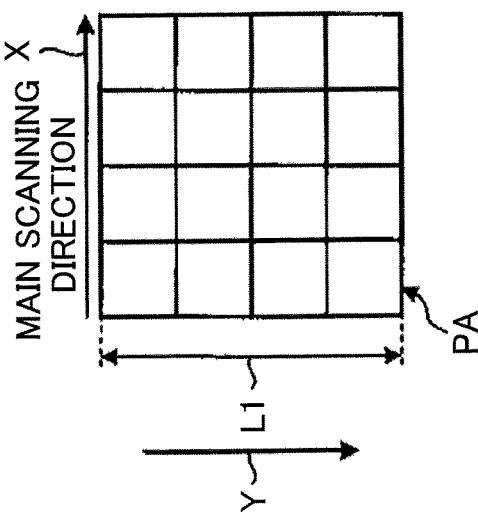

DOT SHAPE

R  B  G

GRAY (DARK)  BLACK  GRAY (LIGHT)

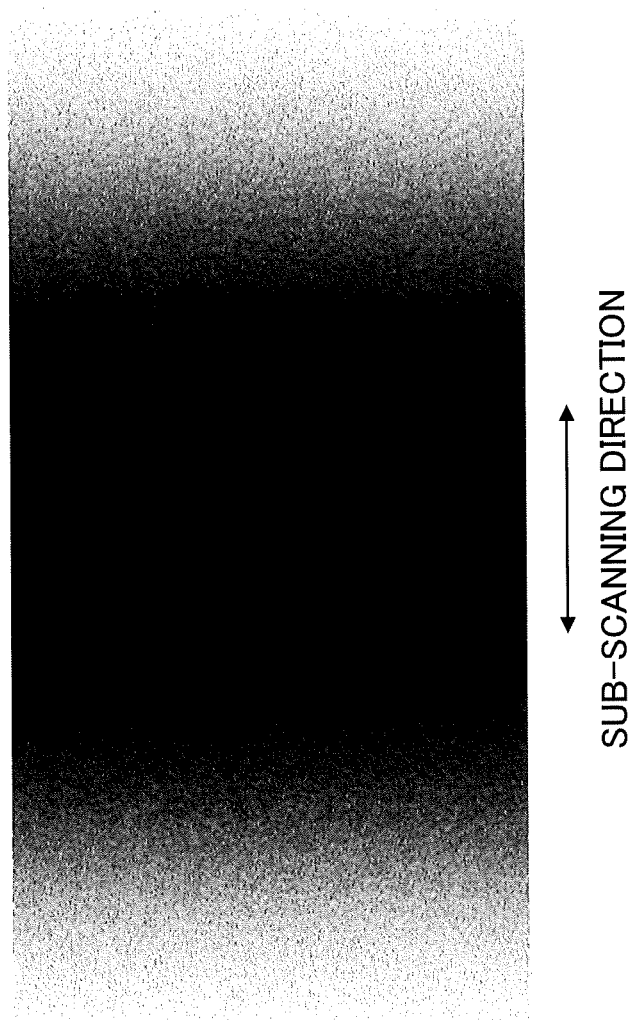

LIQUID DISCHARGING APPARATUS, METHOD FOR DISCHARGING LIQUID AND RECORDING MEDIUM

CROSS-REFERENCE TO RELATED APPLICATION

The present application claims priority under 35 U.S.C. § 119 to Japanese Patent Application No. 2018-226137, filed Nov. 30, 2018, the contents of which are incorporated herein by reference in their entirety.

BACKGROUND OF THE INVENTION

1. Field of the Invention

The present disclosure relates to a liquid discharging apparatus, a method for discharging liquid, and a recording medium.

2. Description of the Related Art

In order to form images, inkjet printers are known to discharge ink onto a print medium with moving of a print head and the print medium relatively, the print head including a plurality of nozzles.

When such an inkjet printer performs bidirectional printing, different colored inks at a given dot are discharged in a different order, and thus shapes of ink surfaces differ between a forward pathway and a backward pathway during scanning. As a result, boundaries appear. Such a boundary appears to be belt-like in a scanning direction of a print head, and may result in presence of banding of a print image, the banding meaning a glossy unevenness.

For such glossy banding, there is a trade-off between productivity and quality. Increased productivity leads to glossy banding, which results in reductions in image quality. To allow for an image with high quality and without glossy banding, as well as increased productivity, "gradation mask" techniques are used.

For example, Japanese Unexamined Patent Application Publication No. 2011-173406, which is hereafter referred to as Patent document 1, proposes that various gradation curves are marked in both ends of a given print swath, through a print head, as illustrated in FIGS. 1A through 1C. For example, in FIG. 1A, gradation curves are expressed by straight lines 66 and 67. In FIG. 1B, sigmoid gradation curves are expressed by numerals 68 and 69. In FIG. 1C, arc gradation curves are expressed by numerals 70 and 71.

SUMMARY OF THE INVENTION

The present disclosure has one object of preventing gross banding on a print medium, even in a case of a image formation mode in which productivity is increased.

In one aspect according to the present disclosure, a liquid discharging apparatus includes: a print head unit including a nozzle array with a plurality of nozzles in a sub-scanning direction, each nozzle being configured to discharge liquid onto a print medium; a moving unit configured to: move the print head unit in a scanning direction perpendicular to the sub-scanning direction with respect to the print medium, while causing discharge of the liquid onto the print medium; and move, without causing discharge of the liquid, the print head or the print medium in the sub-scanning direction, moving of the print head unit in the scanning direction and moving of the print medium or the print head unit in the sub-scanning direction being alternately performed. The liquid discharging apparatus includes: a line-pitch setting unit configured to set a line pitch by which the print head unit moves, per scan with respect to the sub-scanning direction; a masking unit configured to perform a gradation mask operation in which, in the sub-scanning direction, the number of dots of liquid discharged from the nozzles is decreased toward both end portions, as gradation areas, of a gradation mask formed through the print head unit, the both end portions of the gradation mask corresponding to both end portions of the print head unit; a head driver configured to cause the nozzles of the print head unit to discharge liquid based on image data, wherein the gradation mask operation is performed using a combination of four gradation curve functions and a random function for randomly arranged dots, the four gradation curve functions being a first gradation curve function, a second gradation curve function, a third gradation curve function, and a fourth gradation curve function, wherein a first combination of a first gradation curve marked through the first gradation curve function and a second gradation curve marked through the second curve function is marked in a first end portion of the gradation mask, among the both end portions, and a second combination of a third gradation curve marked through the third gradation curve function and a fourth gradation curve marked through the fourth gradation curve function is marked in a second end portion of the gradation mask, wherein the first gradation curve and the second gradation curve are point-symmetric about a point that is a midpoint of the first end portion of the gradation mask, and wherein the third gradation curve and the fourth gradation curve are point-symmetric about a point that is a midpoint of the second end portion of the gradation mask, wherein, in the sub-scanning direction, a combination of the first gradation curve and the third gradation curve are line-symmetric with respect to a point that is a midpoint of the plurality of nozzles of the nozzle array in the print head unit, and wherein, in the sub-scanning direction, a combination of the second gradation curve and the fourth gradation curve are line-symmetric with respect to a point that is a midpoint of the plurality of nozzles of the nozzle array in the print head unit, and wherein, in the sub-scanning direction, each gradation area of the gradation mask has a width of a product of an integer of the line pitch.

BRIEF DESCRIPTION OF THE DRAWINGS

FIGS. 7A through 7H are diagrams for explaining an example of a print sequence;

FIGS. 12A and 12B are diagrams for explaining an example of a gradation mask in which gradation curves are marked according to one embodiment;

DETAILED DESCRIPTION OF THE EMBODIMENTS

Figure 1A:
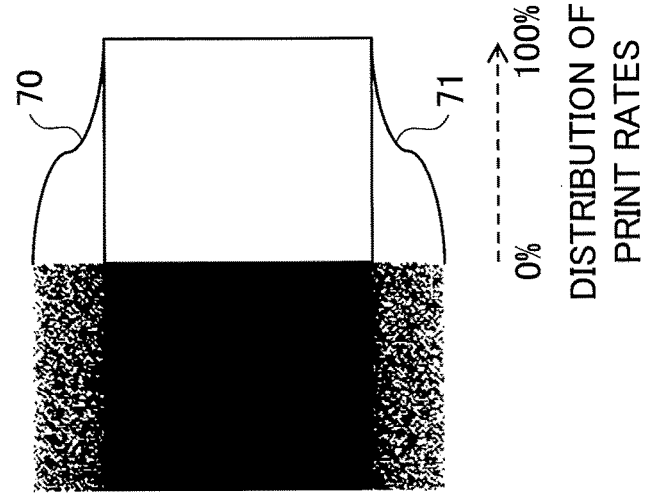
FIGS. 1A through 1C are schematic diagrams for explaining a gradation curve marked in a gradation mask in related art.
Figure 1B:
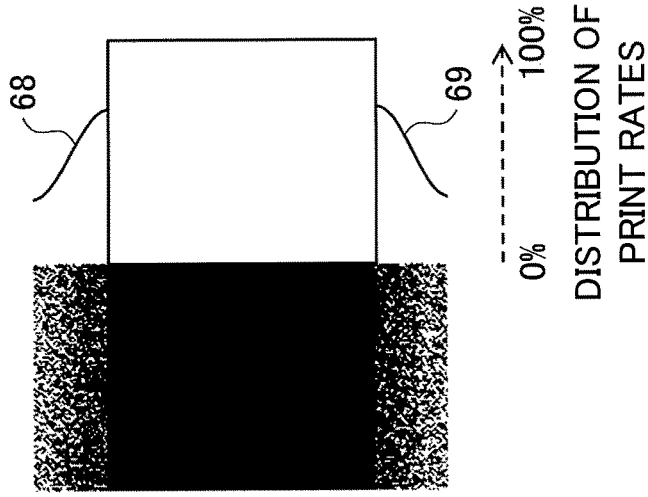
Figure 1C:
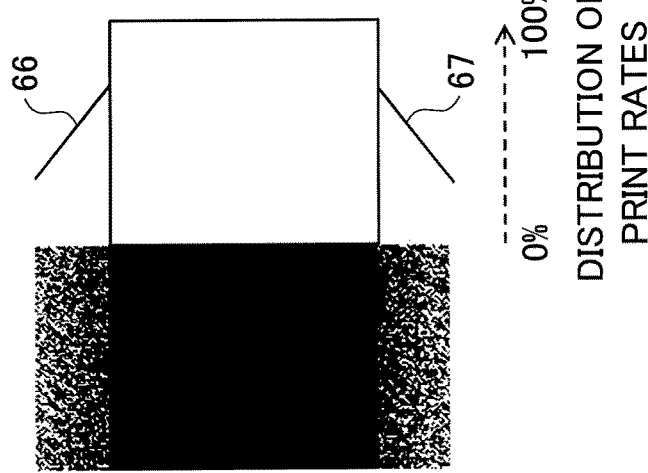

One or more embodiments will be described with reference to the drawings. In each figure, same reference numerals are used to denote the same elements; accordingly, for those elements, explanation may be omitted.

Hereafter, one or more embodiments will be described using a given image forming apparatus as an example for a fluid discharging apparatus.

Figure 2:
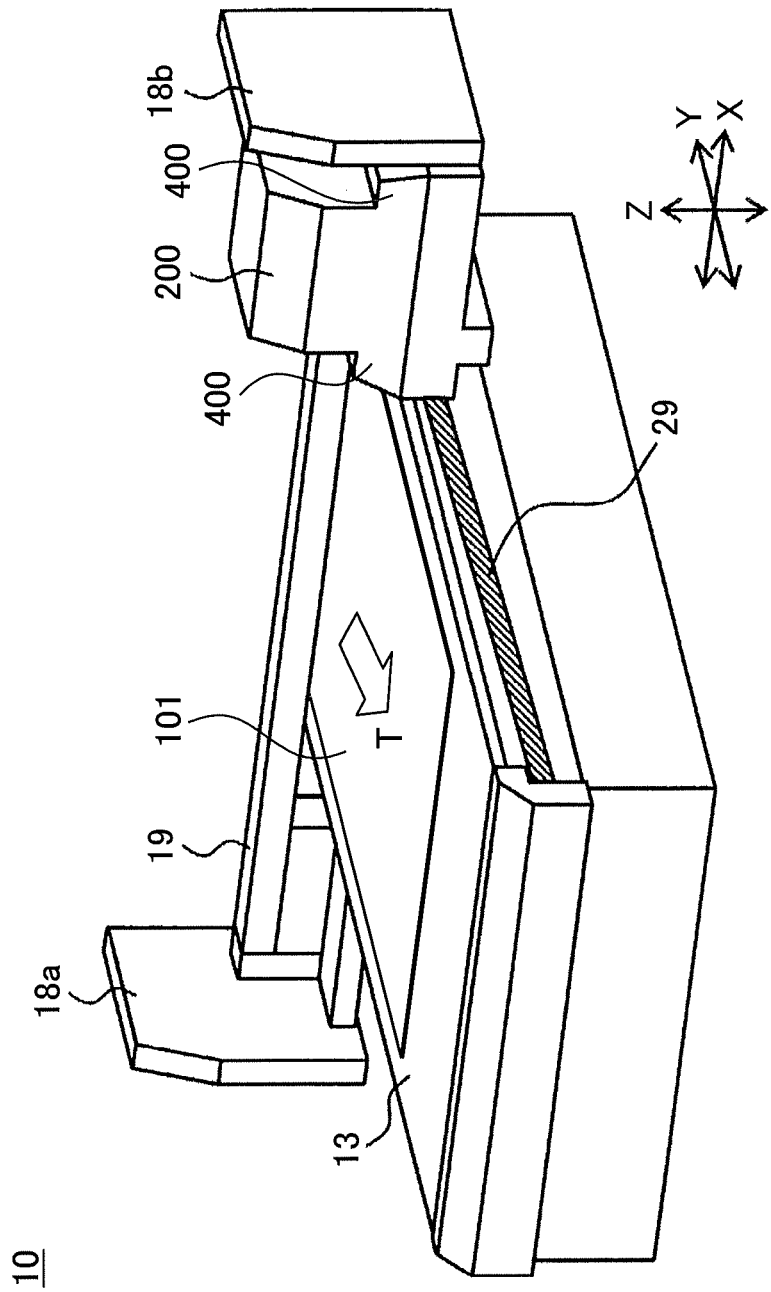
FIG. 2 is a perspective view of an example of the overall configuration of an image forming apparatus according to one embodiment.

FIG. 2 is a perspective view of an example of the overall configuration of an inkjet printer as an image forming apparatus.

An inkjet printer 10 includes a carriage 200 and a stage 13 on which a print medium is placed. The carriage 200 includes each inkjet image formation unit 300 that includes a plurality of print heads for discharging liquid. Each print head includes multiple nozzles. With liquid being discharged from the nozzles of the print heads, an image is formed. A configuration of the image formation unit 300 will be described below in detail with reference to FIG. 5. The nozzles are provided on an opposite side of the stage 13 in scanning. Note that in one or more embodiments, an example of the liquid includes ink having ultraviolet curable characteristics.

An emitting unit 400, which is a light source for emitting ultraviolet light, is provided, in a Z direction, between the carriage and the stage 13. The emitting unit 400 is an example of an emitting unit which emits light having a wavelength that allows liquid discharged from a given nozzle, to cure.

A guide rod 19 is provided between a right side plate 18a and a left side plate 18b. The guide rod 19 holds the carriage 200 capable of moving in an X direction (main scanning direction).

The carriage 200, the guide rod 19, and the side plates 18a and 18b are together capable of being moved in a Y direction (sub-scanning direction), along a guide rail 29 that is provided below the stage 13. Further, the carriage 200 is movably held in the Z direction (vertical direction).

Note that in the example of FIG. 2, the stage 13 on which a print medium is placed is fixed. The inkjet printer 10 illustrated in FIG. 2 alternately performs a main scanning operation and a sub-scanning operation to form an image. Where, in the main scanning operation, ink is discharged from one or more nozzles, onto a print medium with moving of a print head in the main scanning direction. In the sub-scanning operation, a print head is moved in a sub-scanning direction.

In one embodiment, the carriage 200 and the guide rod 19 serve as a moving unit that moves in a main scanning direction (X direction as a second direction). The carriage 200 and the guide rail 29 serve as a moving unit that moves in a sub-scanning direction (Y direction as a first direction).

Figure 3:
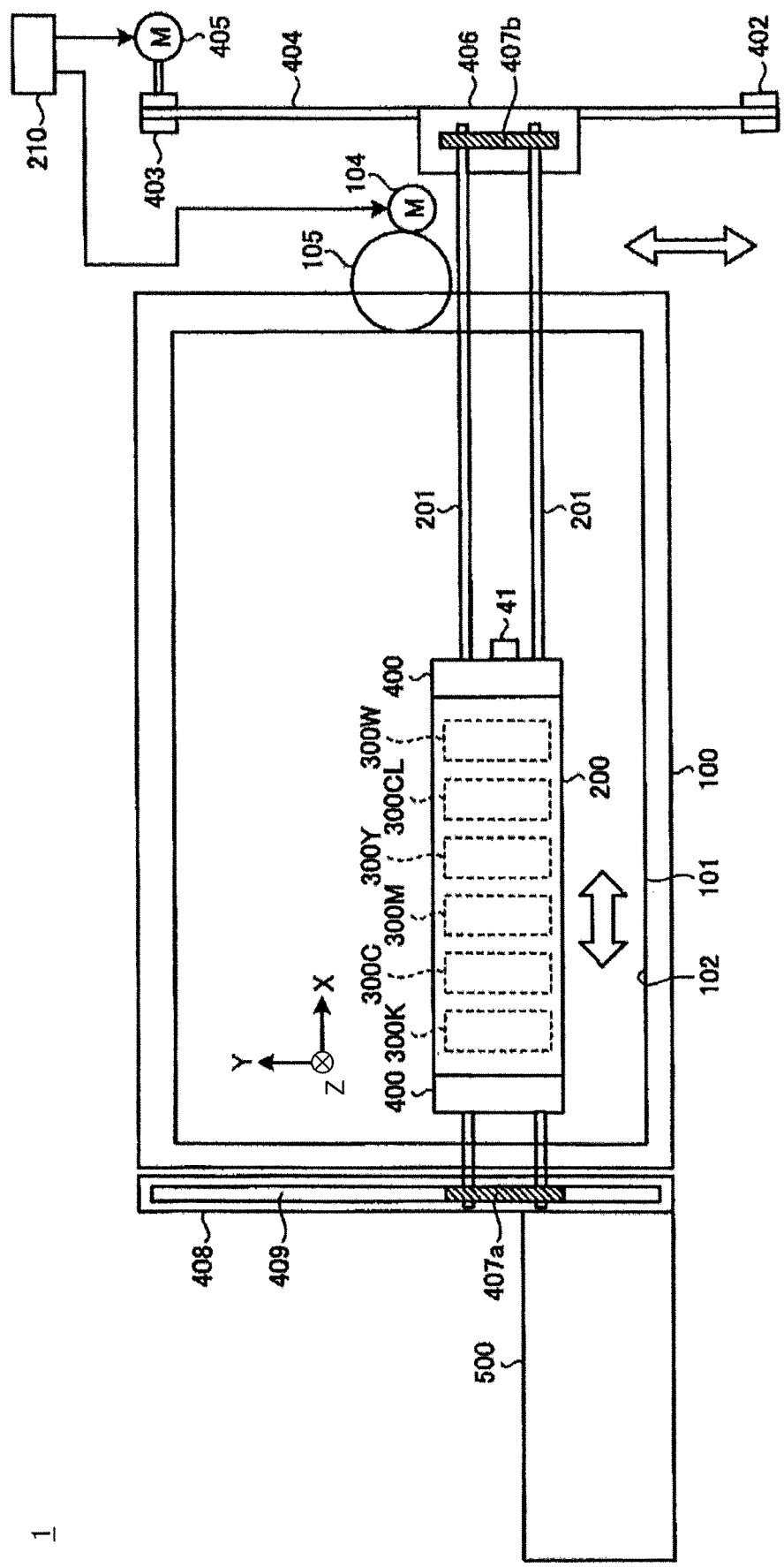
FIG. 3 is a plan view of an example of the surroundings of image formation units of an image forming apparatus according to one embodiment.
Figure 4:
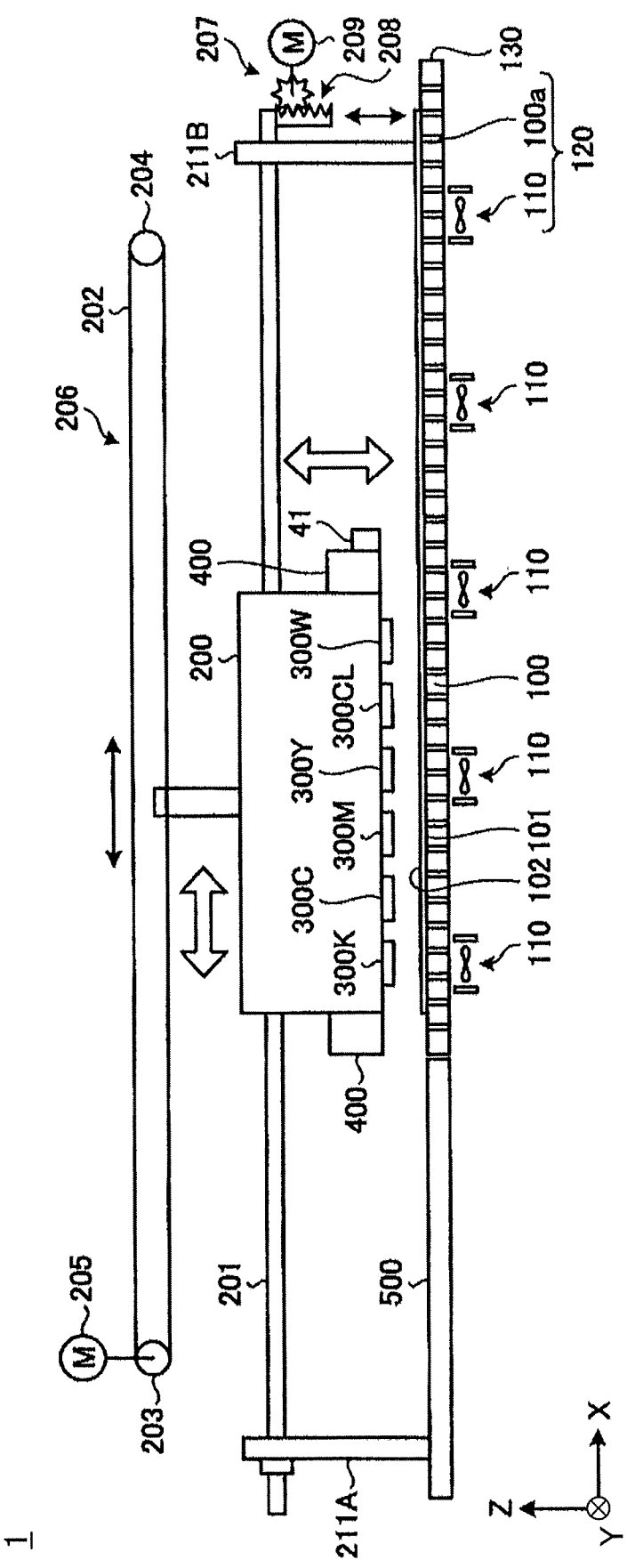
FIG. 4 is a front view of an example of the surroundings of the image formation units of the image forming apparatus in FIG. 3.

FIG. 3 is a plan view of an example of the surroundings of image formation units of another inkjet printer 1 as an example of the image forming apparatus. FIG. 4 is a front view of an example of the surroundings of the image formation units of the inkjet printer 1 in FIG. 3.

In examples of FIGS. 3 and 4, a stage on which a print medium 101 is placed is capable of moving. In a sub-scanning operation, the inkjet printer 1 illustrated in FIGS. 3 and 4 moves the print medium 101 in a sub-scanning direction of the print head.

In this case, the inkjet printer 1 includes a gloss detector for detecting a gloss level of a formed image. Thereby, feedback on a detected result can be given.

Hereafter, an example of a hardware configuration of an image forming apparatus 30, which indicates each of the inkjet printers 1 and 10, will be described.

Figure 5:
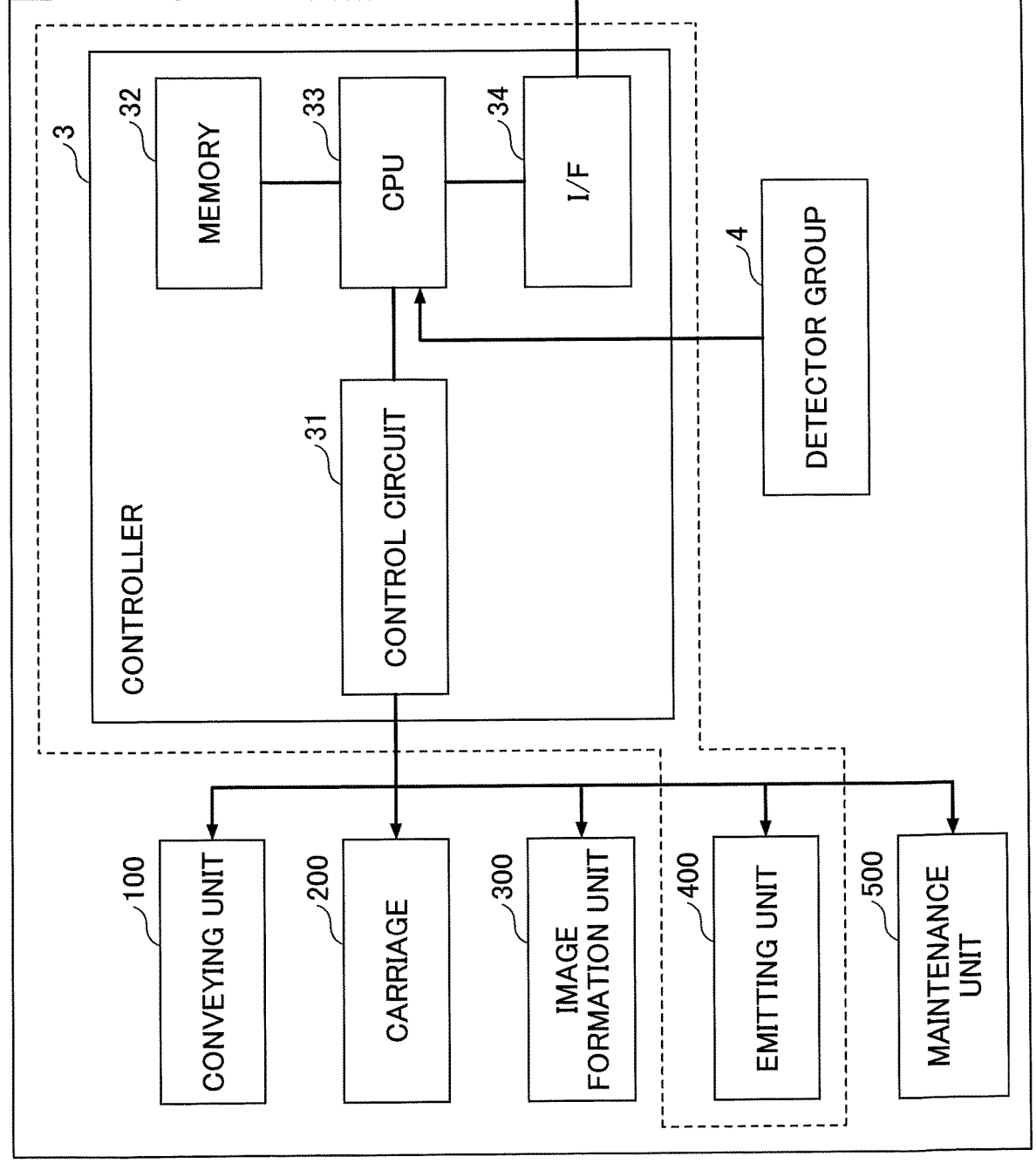
FIG. 5 is a block diagram illustrating an example of a hardware configuration of the image forming apparatus according to one embodiment.

FIG. 5 is a block diagram illustrating an example of a hardware configuration of the image forming apparatus 30 according to the present embodiment. In the example of FIG. 5, a PC (personal computer) 2 that is an external device is connected to the image forming apparatus 30 in which an image is formed using a mechanism of the image forming apparatus 30. Note that the image forming apparatus 30 may include a function of the PC 2. The PC 2 may include a function of the image forming apparatus 30.

As illustrated in FIG. 5, the image forming apparatus 30 (inkjet printer 1 or 10) according to the present embodiment includes a controller 3; a detector group 4; a conveying unit 100 as a conveying unit; a carriage 200; one or more image formation units 300 as an example of heads for discharging liquid; an emitting unit 400; and a maintenance unit 500.

The controller 3 includes a control circuit 31, a memory 32, a central processing unit (CPU) 33, and an interface (I/F) 34. Note that a curing device is indicated by a dashed line in FIG. 5, and includes at least the components of the controller 3 and the emitting unit 40.

The I/F 34 is an interface for connecting the image forming apparatus 30 to the external PC 2. A manner of connecting the image forming apparatus 30 to the PC 2 is not restricted, and includes a connection via a network, a direct connection via a communication cable, or the like, for example.

For example, the detector group 4 includes various sensors that include a height sensor 41 provided in the inkjet printer 1, as illustrated in FIGS. 3 and 4.

The CPU 33 uses the memory 32 as a working area to control the operation of each component of the image forming apparatus 30, through the control circuit 31. Specifically, the CPU 33 controls the operation of each component based on print data received from the PC 2 and data detected by the detector group 4. Further, the CPU 33 causes an image to be formed on a print medium 101 (which is also referred to as a substrate or the like), where the formed image has a surface 102 (see FIG. 3) on which liquid is discharged.

Note that a printer driver is installed in the PC 2, and print data to be transmitted to the image forming apparatus 30 is generated through the printer driver, based on image data. The print data includes command data for operating a conveying unit 100 or the like of the image forming apparatus 30, and includes pixel data relating to an image (the surface 102 on which liquid is discharged in FIG. 3). The pixel data includes 2-bits data per pixel and is represented with 4 levels of gradation.

Hereafter, a mechanism of the image forming apparatus will be described with reference to FIGS. 2 to 5. In FIGS. 3 through 5, the conveying unit 100 includes a stage 130 and a suction-applying mechanism 120. The suction-applying mechanism 120 includes a plurality of suction holes 100a provided through fans 110 and the stage 130. The suction-applying mechanism 120 drives the fans 110 to apply suction to a print medium 101 through suction holes 100a. Thus, the suction-applying mechanism 120 temporarily secures the print medium 101 to the conveying unit 100. The suction-applying mechanism 120 may adsorb a sheet of paper as the print medium 101 by electrostatic adsorption. The conveying unit 100 is controlled based on a drive signal from the CPU 33 (control circuit 31) to move in a Y-axis direction (sub-scanning direction)

In the examples of FIGS. 3 and 4, the conveying unit 100 includes a conveyance controller 210, a roller 105, and a motor 104. The conveyance controller 210 drives the motor 104 to rotate the roller 105. Thereby, a print medium 101 is moved in the Y-axis direction (sub-scanning direction).

The conveying unit 100 may move the carriage 200 in the Y-axis direction (sub-scanning direction), instead of the print medium 101 illustrated in FIG. 2. In this case, the conveying unit 100 relatively moves a given print medium 101 and the carriage 200 in the Y-axis direction (sub-scanning direction).

For example, as illustrated in FIG. 3, the conveying unit 100 includes a side plate 407b; a member 406 for supporting the side plate 407b; and a belt 404 supported by the member 406, where the side plate 407b supports two guides 201 for guiding the carriage 200 in an X-axis direction (main scanning direction). The conveying unit 100 includes a drive pulley 403 and a driven pulley 402 around which the belt 404 is looped. The conveying unit 100 includes a motor 405 for rotationally driving the drive pulley 403, and includes the conveyance controller 210.

As illustrated in FIG. 3, the conveying unit 100 further includes a side plate 407a, a member 408 for slidably supporting the side plate 407a, and a groove 409 that is formed in the member 408 to guide the side plate 407a in the sub-scanning direction. The side plate 407a supports the two guides 201 for guiding the carriage 200 in the X-axis direction (main scanning direction).

With driving of a motor 405 through the conveyance controller 210, the conveying unit 100 rotates the drive pulley 403 to move the belt 404 in the Y-axis direction (sub-scanning direction). Based on movement of the belt 404, the member 406 for supporting the carriage 200 moves in the Y-axis direction (sub-scanning direction), and the carriage 200 can thereby move in the Y-axis direction (sub-scanning direction). Based on movement of the member 406 in the Y-axis direction (sub-scanning direction), the side plate 407a is moved in the Y-axis direction (sub-scanning direction), along the groove 409 in the member 408.

In the examples of FIGS. 2 and 3, the carriage 200, the member 406, the belt 404, the drive pulley 403, the driven pulley 402, the motor 405 that rotationally drives, and the like, serve as a moving unit that moves in a main scanning direction (X direction as a second direction). Further, the conveying unit 100 such as the stage 130, the roller 105, and the motor 104, serves as a moving unit that moves in a sub-scanning direction (Y direction as a first direction).

As illustrated in FIGS. 3 and 4, the respective image formation units 300 include head arrays 300K, 300C, 300M, 300Y, 300CL, and 300W that discharge UV (Ultraviolet) curable inks (which are examples of liquid) of K (black), C (cyan), M (magenta), Y (yellow), CL (clear), and W (white). Each image formation unit 300 is provided on a lower surface of the carriage 200.

The head arrays 300K, 300C, 300M, 300Y, 300CL, and 300W (which may be hereafter referred to as 300K through 300W) each include one or more print heads. When multiple print heads are provided in a head array, the multiple print heads may be disposed in a staggered pattern, or may be arranged in a row.

Each print head includes a piezo drive element. When a drive signal is applied to the piezo drive element by the CPU 33 (control circuit 31), the piezo drive element causes a pressure change due to a contraction movement, thereby discharging a given UV curable ink onto a print medium 101. In such a manner, the print medium 101 has a surface 102 on which liquid is discharged.

In the present embodiment, for example, a suitable UV curable ink includes ink including methacrylate-based monomers. The methacrylate monomers advantageously have relatively low skin sensitivity, and have characteristics of allowing for cure shrinkage, compared to commonly used ink.

The emitting unit 400 is provided on a side (side toward an X-axis direction) of the carriage 200, and emits UV light based on a drive signal from the CPU 33 (control circuit 31). The emitting unit 400 mainly includes UV (Ultraviolet) lamps that emit UV light.

The carriage 200 is controlled based on a drive signal from the CPU 33 (control circuit 31) to move in a Z-axis direction (height direction) and the X-axis direction (main scanning direction).

The carriage 200 scans while moving along the guides 201 in the main scanning direction (X-axis direction). A scanning unit 206 includes a drive pulley 203, a driven pulley 204, a drive belt 202, and a motor 205. The carriage 200 is secured to the drive belt 202 which is looped around the drive pulley 203 and the driven pulley 204. When the drive belt 202 is driven by a motor 205, the carriage 200 scans while moving in either direction along the main scanning direction. The guides 201 are supported by the side plates 211A and 211B that are provided in the inkjet printer 1 as illustrated in FIG. 3.

The height adjusting unit 207 includes a motor 209 and a slider 208. The height adjusting unit 207 drives the motor 209 to vertically move the slider 208, and the guide 201 is vertically moved accordingly. With vertical movement of the guide 201, height of the carriage 200 from a print medium 101 can be adjusted.

<Image Forming Operation>

Hereafter, an image forming operation of the image forming apparatus 30 will be described with reference to FIGS. 3 through 5.

First, the conveying unit 100 moves in a Y-axis direction (sub-scanning direction) based on a drive signal from the CPU 33 (control circuit 31) to cause a print medium 101 to be positioned in an initial location where an image has a surface 102 on which liquid is to be discharged.

Subsequently, the carriage 200 moves to be located at a height suitable for discharging a given UV curable ink through each image formation unit 300, based on a drive signal from the CPU 33 (control circuit 31). For example, the height corresponds to spacing of 1 mm, the spacing being between a print medium 101 and a lower surface of each of the head arrays 300K through 300W of the image formation units 300. Note that height of each image formation unit 300 is detected by the height sensor 41, and a detected result is thereby recognized by the CPU 33.

Subsequently, the carriage 200 moves forward and backward in an X-axis direction (main scanning direction) based on a drive signal from the CPU 33 (control circuit 31). When the carriage 200 moves forward and backward, each image formation unit 300 discharges a UV curable ink based on a drive signal from the CPU 33 (unit control circuit 31). Thereby, an image (which has a surface 102 on which liquid is discharged) is formed on a print medium 101, with one scan.

Subsequently, with one scan, after the image (which has the surface 102 on which liquid is discharged) is formed on the print medium, based on a drive signal from the CPU 33 (control circuit 31), the conveying unit 100 moves in a Y-axis direction (sub-scanning direction), by one scan pitch.

Until a given image (which has a surface 102 on which liquid is discharged) is completely formed, operation of forming an image (which has a given surface on which liquid is discharged) with one scan; and operation of moving the conveying unit 100 in the Y-axis direction, by one scan pitch, are alternately performed.

As a result, the given image (which has a surface 102 on which liquid is discharged) is completely formed on a print medium 101. Then, the image forming apparatus 30 waits for a time (which may be hereafter referred to as "leveling time") until UV curable inks are smoothed. Subsequently, UV light is emitted by the emitting unit 400.

(Functional Configuration of Image Forming System)

Figure 6:
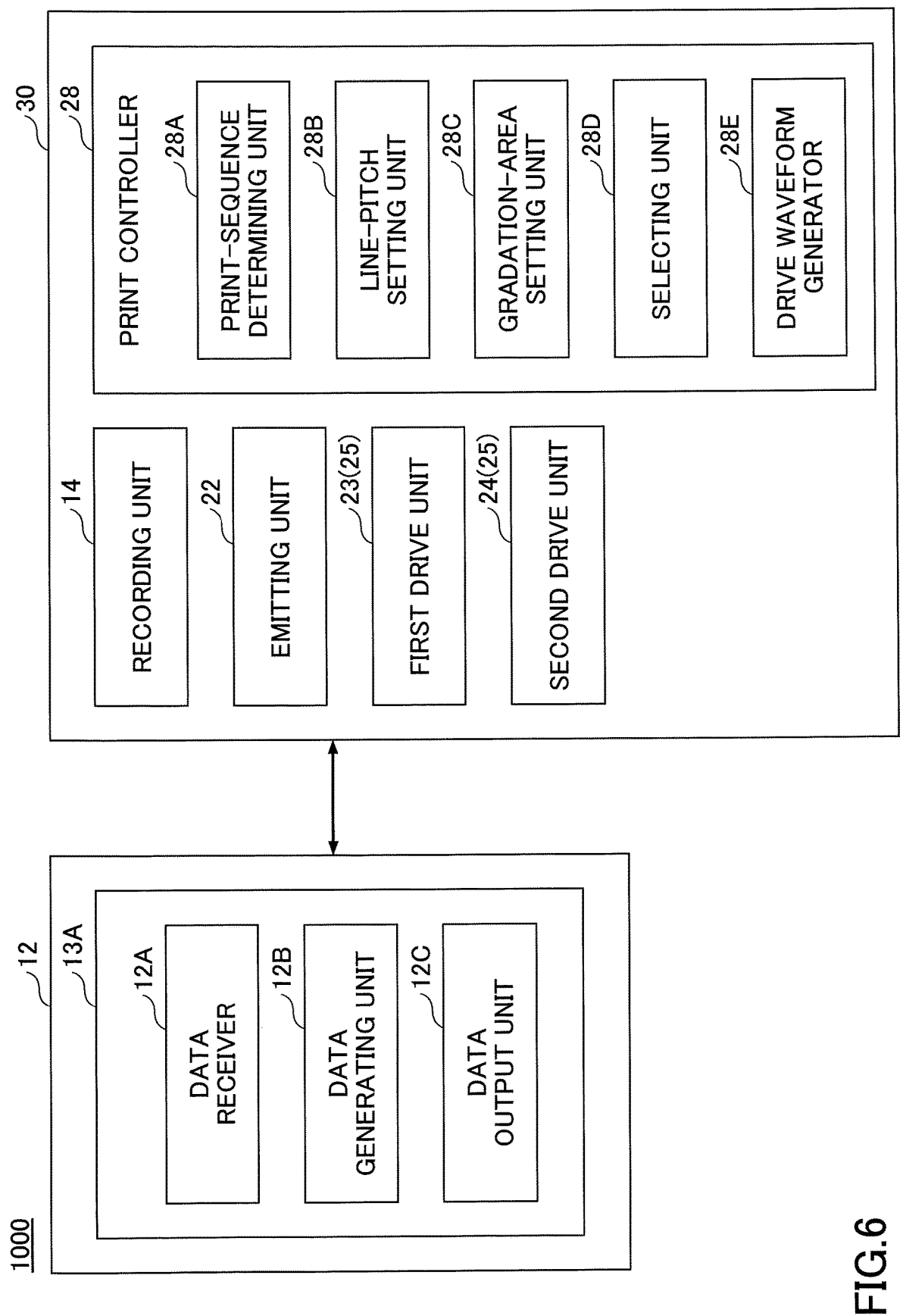
FIG. 6 is a block diagram illustrating an example of a functional configuration relating to image formation implemented by an image forming system according to one embodiment.

FIG. 6 is a block diagram illustrating an example of a functional configuration relating to image formation implemented by an image forming system.

An image forming system 1000 includes an image processing device 12 and the image forming apparatus 30. The image processing device 12 includes a main controller 13A. The main controller 13A is a computer that includes a CPU and the like, and controls the entire image processing device 12. Note that for example, the main controller 13A may include a circuit or the like, instead of a commonly used CPU.

The image processing device 12 may be implemented by a PC 2 connected to the image forming apparatus 30 as illustrated in FIG. 5, or may be integrated into the image forming apparatus 30.

The main controller 13A includes a data receiver 12A, a data generating unit 12B, and a data output unit 12C. A combination of the data receiver 12A, the data generating unit 12B, and the data output unit 12C may be partially or wholly implemented by software that causes a processing device such as a CPU to execute a program, or by hardware such as an IC (integrated circuit). Such a combination may be implemented by a combination of software and hardware.

The data receiver 12A receives image data. The image data includes information on a shape, color of a target image, and the like. The data receiver 12A may receive image data from an external device through a communication unit, or receive image data via a storage unit provided in the image processing device 12.

The data generating unit 12B performs data processing such as a mask operation that is performed based on image data received from the data receiver 12A. In the present embodiment, the data generating unit 12B generates colored-ink image data and clear-ink image data, based on image data (e.g., JPEG image data) and a suitable gloss level.

The data output unit 12C outputs image data generated by the data generating unit 12B, to the image forming apparatus 30.

The image forming apparatus 30 includes a recording unit 14, a print controller 28, a drive unit 25, and an emitting unit 22.

The recording unit 14 serves as a head driver that causes head arrays 300K through 300W to discharge droplets based on image data (drive data, drive waveforms), under control of the print controller 28, where gradation mask operation is performed based on the image data.

The drive unit 25 drives a moving unit, and includes a first drive unit 23 and a second drive unit 24. The first drive unit 23 moves a carriage 200 in an X direction, during scanning. The second drive unit 24 moves the carriage 200 or a print medium 101 in a sub-scanning direction, during sub-scanning.

The print controller 28 receives the image data from the image processing device 12. The print controller 28 controls the recording unit 14, the drive unit 25, and the emitting unit 22 to discharge liquid having a droplet size, from a print head 18, in accordance with received image data, where the droplet size corresponds to a given pixel.

For example, the print controller 28 performs operations such as calculating time elapsing after discharging ink and before emitting light; calculating a gloss level of an image formed on a print medium 101, based on a discharged amount of ink and time elapsing after discharging ink and before emitting light; and estimating a discharged amount of clear ink that allows for a uniform gloss level.

The print controller 28 includes a print-sequence determining unit 28A, a line-pitch setting unit 28B, a gradation-area setting unit 28C, a selecting unit 28D, and a drive waveform generator 28E.

The print-sequence determining unit 28A determines a print sequence based on image data. Under control of bidirectional printing, in the print sequence, a carriage 200 having the recording unit 14 scans many times with respect to both of forward and backward ways along a main scanning direction to form an image in an image formation area where the image is formed.

The print-sequence determining unit 28A controls forming of colored ink images based on colored-ink image data. For example, an order in which each colored ink image is formed; an amount of each ink adhered to a print medium; and a position (dot position) at which a given ink is adhered, are controlled.

The line-pitch setting unit 28B sets a line pitch or an overlap width in accordance with a print sequence. The line pitch corresponds to spacing in a sub-scanning direction between a forward pathway and a backward pathway, when forming one image region with allocation by multiple scans.

The print-sequence determining unit 28A and the line-pitch setting unit 28B serve as a scanning-operation determining unit.

The gradation-area setting unit 28C sets one or more gradation areas based on a line pitch or an overlap width.

Specifically, the gradation-area setting unit 28C performs a gradation-mask operation. In the gradation mask operation, in the sub-scanning direction, the number of dots arranged with inks discharged from nozzles is gradually decreased toward both end portions of a gradation mask that is formed through a print head unit (a head array or each head), the both end portions corresponding to both end portions of the print head unit. In the following, the both end portions of the gradation mask may be hereafter each referred to as a gradation area.

In order to decrease the number of dots, a print rate is reduced. The print rate refers to a ratio of a first pixel total to a second pixel total, where the first pixel total is the sum of pixels where ink is discharged from one or more nozzles of each head of a head array, based on each value of pixel data. The second pixel total is the sum of pixels relating to the pixel data.

For example, when a head array scans at a predetermined speed and a given nozzle of the head array can discharge X droplets (X is an integer), in a case where the given nozzle performs a discharge operation at all locations, a print rate indicates 100%. However, the given nozzle may not perform the discharge operation at all locations. In this case, a print rate (%) is given based on the number of times in which output data (drive data) for actually performing discharge operation is applied, where X droplets is set as a parameter.

The selecting unit 28D selects either of a print head or a head array, as a component that forms a gradation mask having two gradation areas described above. The gradation-area setting unit 28C and the selecting unit 28D serve as a masking unit.

Note that in this example, a print head or a head array is selected after gradation areas are set. However, such a process order may be reversed.

The drive waveform generator 28E generates drive waveform data based on image data.

Note that print heads or head arrays for all colors may be used in a gradation mask operation, or one or more head arrays 300K, 300C, 300M, 300Y, and 300W, from among heads 300Y through 300W, may be used in gradation mask operation.

Note that in the example of FIG. 6, the image forming apparatus 30 has a function of adjusting gradations in two gradation areas. However, the data generating unit 12B of the image processing device 12 may include such a function.

Another information processing apparatus (e.g., a host device) connected to a PC 2 preliminarily stores a program for discharging liquid, in a given format (e.g., a CSV (Comma Separated Value) format or an Excel format). In this case, the PC 2 retrieves such a program to execute the program. Thereby, gradations can be adjusted in boundaries as described below.

<Print Sequence>

Hereafter, a print sequence for image formation will be described. FIGS. 7A through 7H are diagrams for explaining an example of a print sequence.

In one embodiment, in order to achieve image formation, the data generating unit 12B (see FIG. 6) generates image data per image unit that an image forming unit 300 forms with one scan with respect to a main scanning direction. Where, scanning is performed is in accordance with a print pitch; an order in which a given ink is discharged; and arrangement of print heads of each of the head arrays 300K through 300W.

In each of FIGS. 7A through 7H, one of square cells indicates one dot of a print image. A number inside a given square cell indicates an order in which a given print head scans. Each of the print sequences as illustrated in FIGS. 7A through 7H is followed to repetitively scan with respect to a main scanning direction X and a sub-scanning direction Y, and a print image is thereby formed.

Note that the number of times in which ink is discharged with respect to a main scanning direction X may be expressed by path. For example, when the number of times in which ink is discharged with respect to a main scanning direction X is one, such a number is referred to as one path. When the above number is two, the number is referred to as 2 paths.

The number of times in which ink is discharged with respect to a sub-scanning direction Y may be expressed by interlace. For example, when the number of times in which ink is discharged with respect to a sub-scanning direction Y is one, the number is referred to as 1/1 interlace. When such a number is two, the number is referred to as 1/2 interlace.

The number of times in which ink is discharged with respect to a main scanning direction X and a sub-scanning direction Y is referred to as the number of times N in which ink is discharged. For example, for 1 path-1/1 interlace illustrated in FIG. 7B, the number of times N is set as N=1. Further, for 2 paths-1/1 interlace illustrated in FIG. 7C; or 1 path-1/2 interlace illustrated in FIG. 7D, the number of times N is set as N=2.

For 2 paths-1/2 interlace illustrated in FIG. 7E, the number of times N is set as N=4. For 4 paths-1/2 interlace illustrated in FIG. 7F; or 2 paths-1/2 interlace illustrated in FIG. 7G, the number of times N is set as N=8. For 4 paths-1/2 interlace illustrated in FIG. 7H, the number of times N is set as N=16.

Note that a print sequence for 1 path illustrated in each of FIGS. 7B and 7D is also referred to as a normal mode. A print sequence for multiple paths illustrated in each of FIGS. 7C, 7E, 7G, and 7H is also referred to as a multiple print mode.

In such a manner, in the image forming apparatus 30, the carriage 200, which includes the head arrays 300K through 300W, scans N (N indicates a natural number) times, with respect to a main scanning direction X to discharge liquid from each head array in a target area PA (see FIG. 7A), while a print medium is conveyed in a sub-scanning direction Y. Where, in the sub-scanning direction Y, the target area PA has a length (e.g., length L1 in FIG. 7A) that is shorter than a distance of liquid being discharged at one time. Note that N indicates a same number as the number of times in which ink is discharged, as described above.

In the present embodiment, as long as gradation areas are provided by each print head or each head array that repetitively scans, interlace is not restricted.

Note that with respect to each of the inkjet printers 1 and 10, a default setting of a print form or the like includes: a designated normal mode; a designated multiple print mode with a given number of multipaths; a designated interlaced print mode with a given number of interlaces. The designated print mode (normal mode, multiple print mode, or interlaced print mode); the number of multipaths; and the number of interlaces are stored, as a given print form, by a storage medium such as a memory (not illustrated).

<Glossy Banding>

Figure 8A:
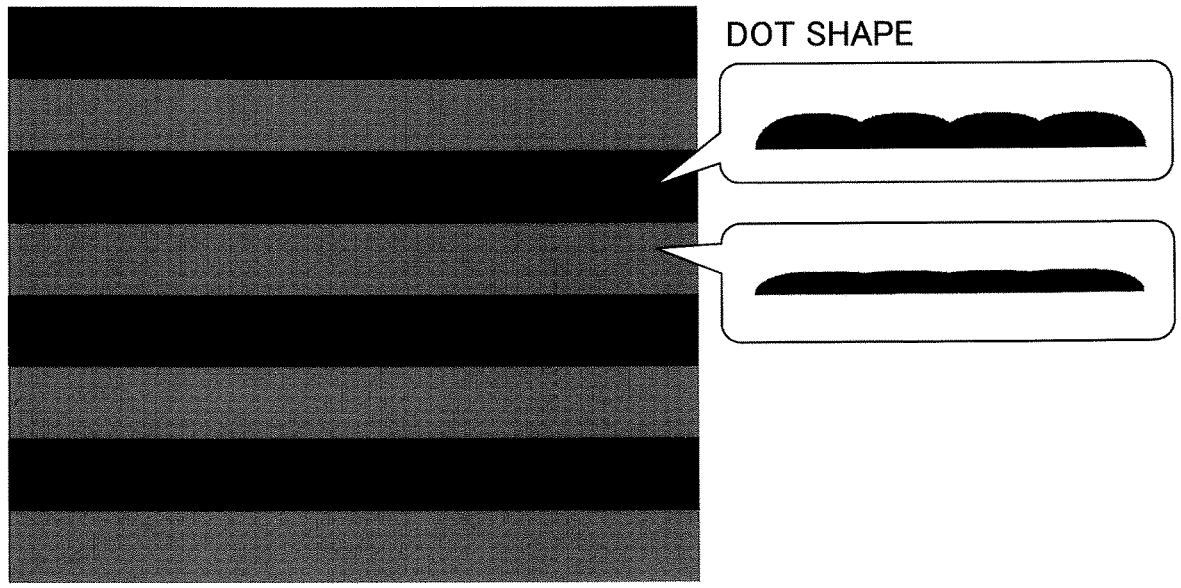
FIGS. 8A and 8B are diagrams for explaining an example of glossy banding.
Figure 8B:
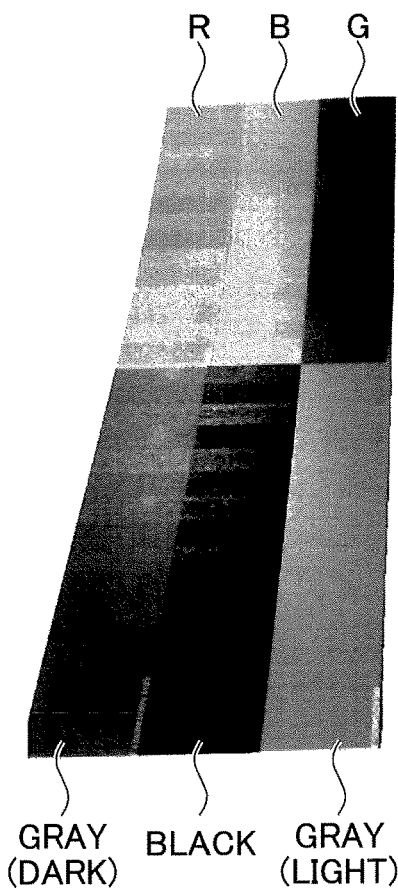

FIGS. 8A and 8B are diagrams for explaining an example of glossy banding.

For image formation by a given inkjet printer, for example, in a case of an inkjet printer using UV inks, in general, time after discharging ink and before emitting UV light; or a power of a light source, is controlled to adjust a shape of the top surface of a print image.

In general, with light being emitted by a light source immediately after ink is discharged, ink is cured to form a print image. Additionally, in order to perform image formation, ink is discharged and then light is emitted after a lapse of a given period. For example, a coating method provides gloss in appearance. In this case, ink is discharged onto a print medium and then UV light is emitted after a certain period of time; subsequently, a surface of cured ink is smoothed. Also, time after discharging ink and before emitting UV light is controlled, and gloss is thereby controlled.

However, the inventor has recognized the following: time until UV light is emitted is controlled by on or off operation of light. For example, a light source is turned off in a case of scanning (one scan) during discharging of ink; subsequently, during a subsequent scan, UV light is emitted without discharging ink. Thereby, ink discharged with a preceding scan is cured. In this case, when the ink reacts chemically in response to receiving UV light, in a case of bidirectional printing being performed, given colored inks are discharged in a given dot in a different order. Thereby, there is a difference in curing and shrinkage of the inks, and as a result, a boundary appears between a curing portion and an uncured portion. Also, UV lamps mounted on both sides of a carriage are each disposed at a different distance from each colored ink head, and thus an image unevenness may occur at a line pitch where there are a gloss image and a non-gloss image.

Such boundaries appear to be belt-like, in a scanning direction of a print head, as illustrated in FIG. 8B. Thereby, the boundaries result in glossy banding that means a gloss unevenness caused by height of ink included in a print image, during curing.

As illustrated in the example of FIG. 8B, a glossy banding is more likely to occur with respect to a black toner image.

<Gradation Curves>

Figure 9A:
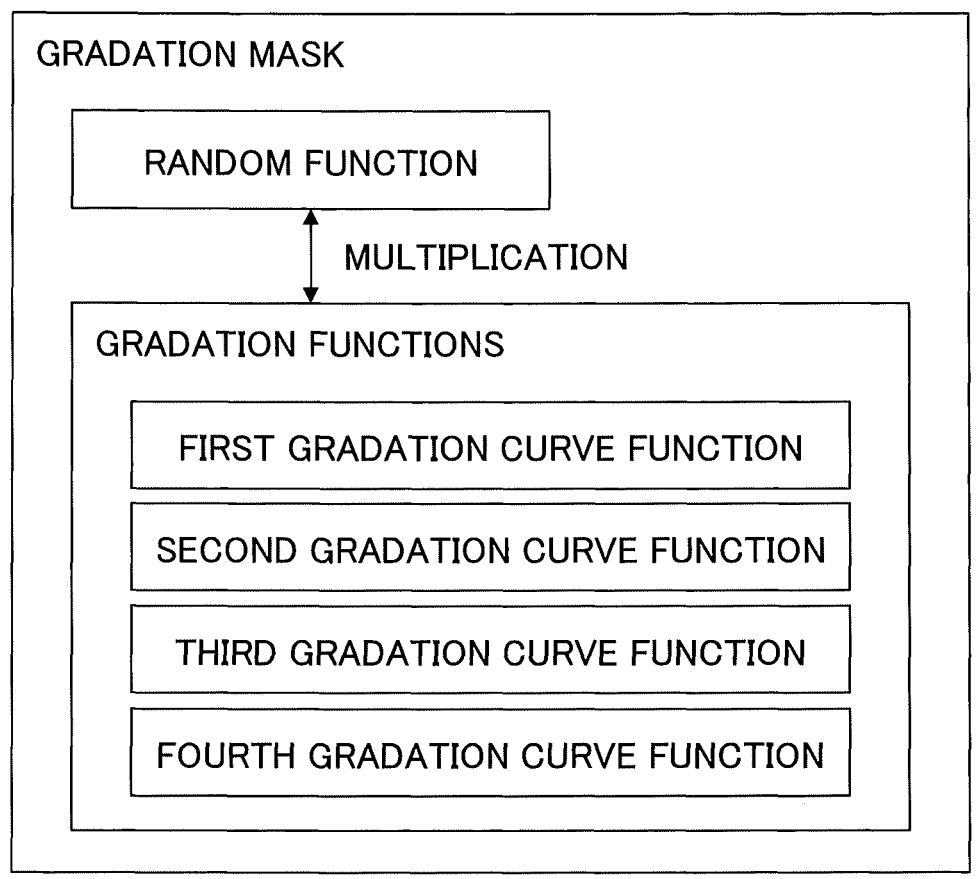
FIGS. 9A and 9B are diagrams for explaining an example of gradation curves marked in a gradation mask according to one embodiment.
Figure 9B:
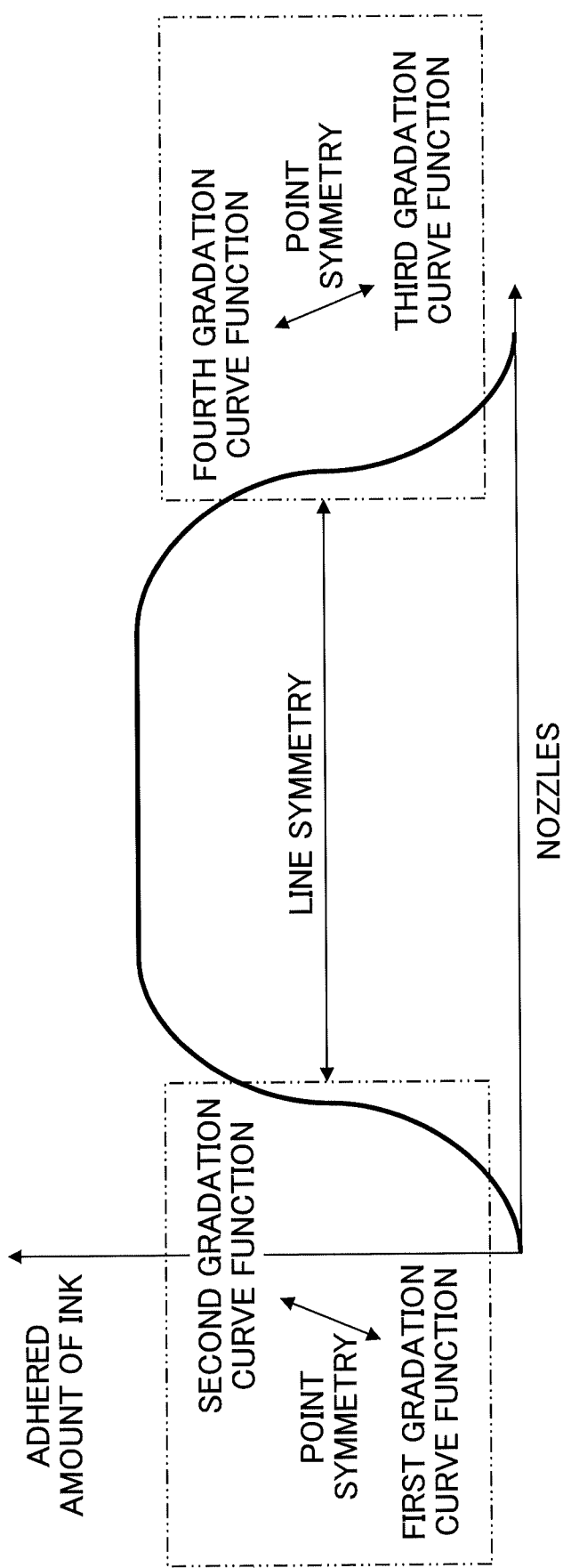

FIGS. 9A and 9B are diagrams for explaining an example of gradation curves marked in a gradation mask according to one embodiment.

In order to adjust gradations, as illustrated in FIG. 9A, a mask operation includes random operation and a gradation operation in which four gradation curve functions are used.

In the gradation operation, a first gradation curve marked through a first gradation curve function and a second gradation curve marked through a second gradation function are point-symmetric. A third gradation curve marked through a third gradation curve function and a fourth gradation curve marked through a fourth gradation curve function are point-symmetric.

A combination of the first gradation curve and the second gradation curve is line-symmetric with respect to a combination of the third gradation curve and the fourth gradation function.

The first gradation curve and the third gradation curve are line-symmetric with respect to a point that is the midpoint of multiple nozzles in a nozzle array of a print head unit, in a sub-scanning direction. The second gradation curve and the fourth gradation curve are line-symmetric with respect to a point that is the midpoint of multiple nozzles in a nozzle array of a print head unit, in a sub-scanning direction.

In the present embodiment, for two curve pairs each consisting of two curves, both curves are point-symmetric about a point that is defined by half of: the number of nozzles aligned in a main scanning direction; or the number of mask blocks aligned in a main scanning direction as described below. In this case, when scanning is performed with respect to either way along a main scanning direction, an amount of ink being discharged first is equal to an amount of ink being discharged last. Thereby, glossy banding is unlikely to occur.

Figure 11:
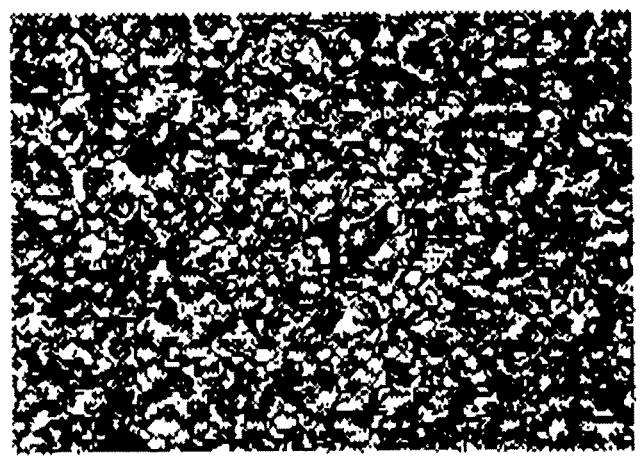
FIG. 11 is a diagram illustrating an example of a dot pattern formed in a random mask.

In the present embodiment, a random function that allows for ink being randomly discharged in a given mask area is used, thereby allowing for ink being dispersedly adhered. With the random function, a random mask in which ink is randomly discharged can be used to form a solid image as illustrated in FIG. 11.

Figure 10A:
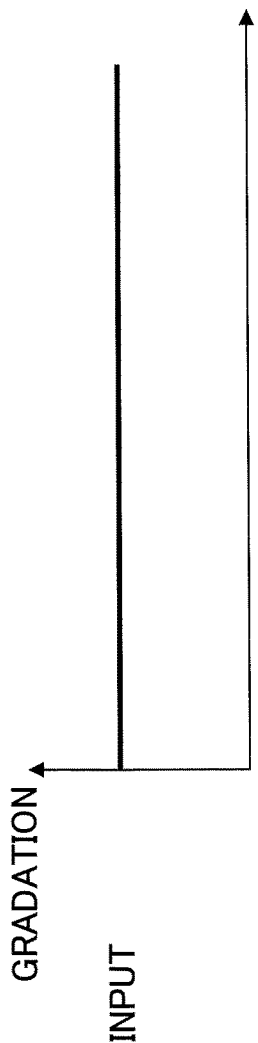
FIGS. 10A through 10C are diagrams for explaining an example of gradations provided in an overlap area between a forward pathway and a backward pathway, in case of forming a gradation mask according to one embodiment.
Figure 10B:
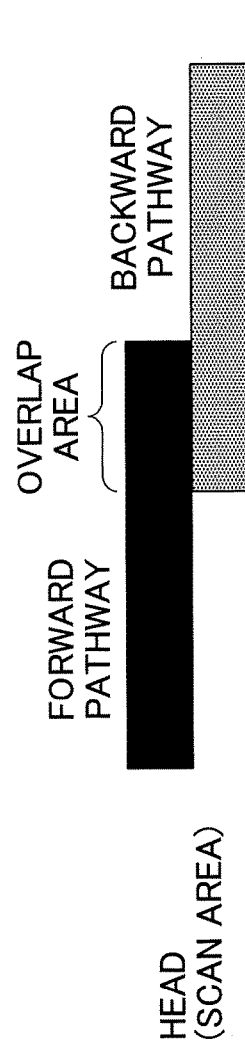
Figure 10C:
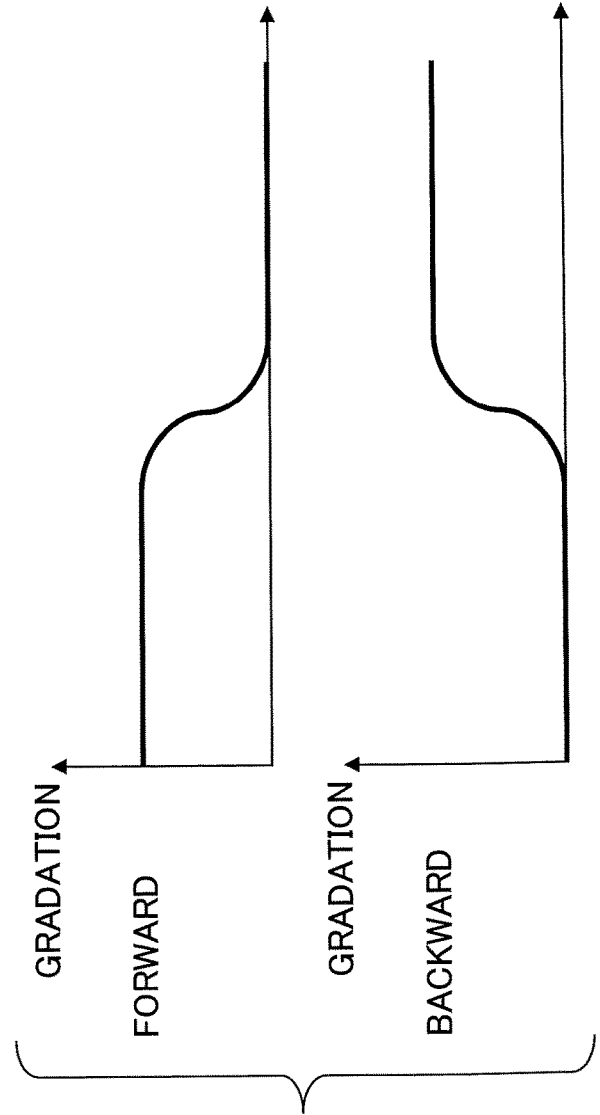

FIGS. 10A through 10C are diagrams for explaining an example of gradations provided in an overlap area between a forward pathway and a backward pathway, the gradations being provided in a gradation mask according to one embodiment.

In a main scanning direction, as an example, based on input data illustrated in FIG. 10A, a gradation mask is used in an overlap area (amount of overlap) between a forward pathway and a backward pathway. Where, in the overlap area, the gradation areas are set.

Specifically, as illustrated in FIG. 10B, in the overlap area where a print head scans, gradations provided in a forward pathway and in a backward pathway are gradually decreased, as illustrated in FIG. 10C. Alternatively, based on the input data illustrated in FIG. 10A, a drive voltage applied to a print head is gradually decreased toward ends of the print head, and a discharged amount of droplets from a print head can be thereby decreased toward the ends of the print head.

In the present embodiment, a mask pattern in which the four gradation curves as illustrated in FIG. 9B are marked, is used, and in an overlap area, two print heads are alternately turned on or off to discharge ink.

In this description, in a gradation mask operation, four gradation curves in which two curve pairs for each pairing, are marked through end portions of a print head. With multiple scans, gradations provided through four gradation curves are complementary to form a suitable image. Thereby, glossy banding can be avoided in an overlap area.

<Random Pattern>

FIG. 11 is a diagram illustrating an example of a dot pattern formed in a random mask.

In the present embodiment, in mask operation, a dot pattern used in a random mask as illustrated in FIG. 11 can be suitably formed, as well as using the gradation mask as described in FIGS. 10A through 10C. For example, for an image pattern such as a solid image that does not have gaps between dots, the random mask may be used.

In the present embodiment, in order to avoid glossy banding, in bidirectional printing, a random function for forming a random mask in which ink is discharged randomly is used to allow for dispersedly adhered ink, as well as using of the above gradation curves. Thereby, in a case of forming a solid image or the like, gaps between dots are decreased and thus a glossy unevenness can be less likely to occur.

Particularly, for example, in a case of using a black ink as an example for a water-based ink, multiple colored inks are laminated on the black ink to form an image. For this reason, glossy banding is more likely to occur. However, as described above, the mask operation is performed to allow for reductions in glossy banding even with respect to a black solid image.

Note that the random mask illustrated in FIG. 11 is described as an example. For example, a random mask function is selected from among different random functions for random masks in each of which a different gap between dots is achieved. Thereby, a given gap is achieved through the selected random mask.

<Gradation Mask>

Figure 12A:
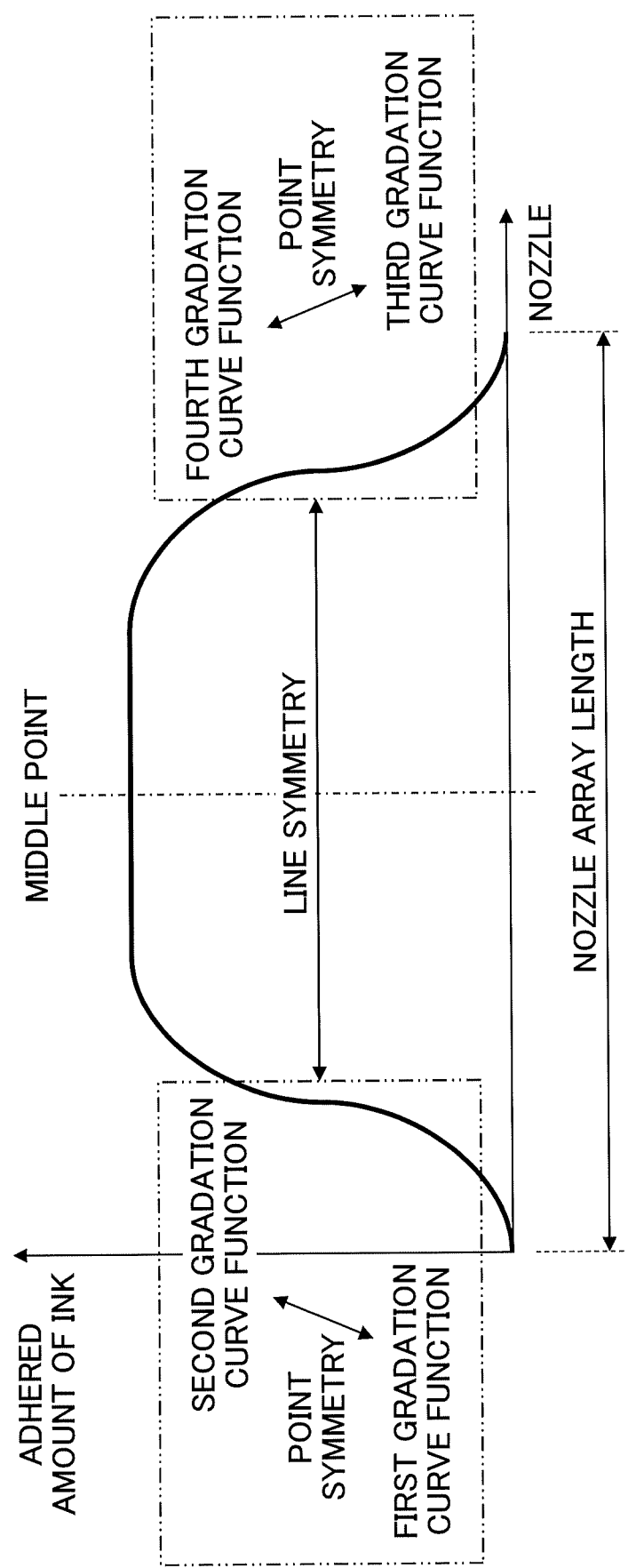

FIGS. 12A and 12B are diagrams for explaining an example of a gradation mask in which gradation curves are marked according to the present embodiment. The four gradation curves in which given two gradation curves are point-symmetric as illustrated in FIG. 9B are marked in a gradation mask, as illustrated in FIG. 12B. In this case, in both end portions of a gradation mask where ink is discharged with one scan, gradations are provided and image density is gradually decreased toward each end portion. The end portions are each also referred to as a gradation area of a gradation mask as described above.

A print head or a head array can provide gradations in gradation areas of a gradation mask, as illustrated in FIGS. 12A and 12B. The detailed explanation will be provided below with reference to FIGS. 15 through 19.

<Path and Curve>

Figure 13:
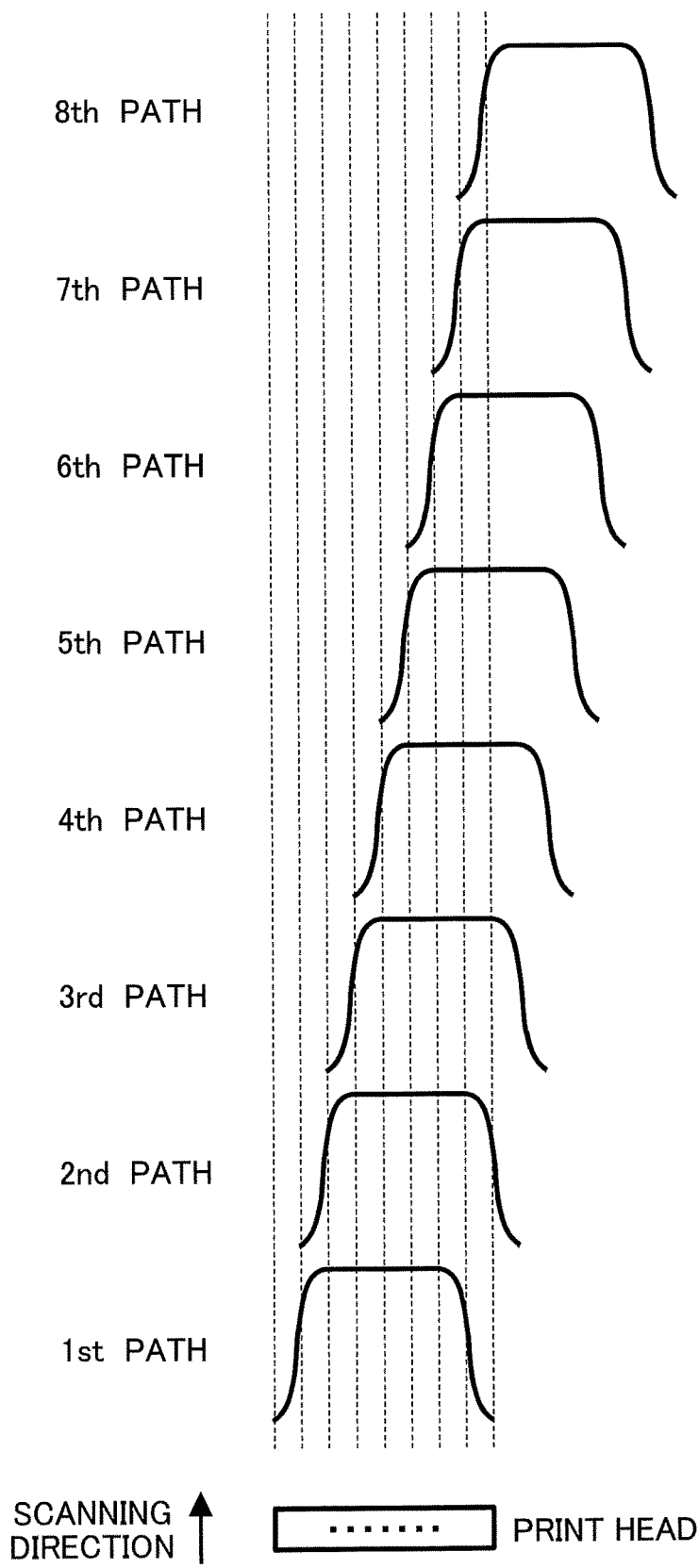
FIG. 13 is a diagram for explaining an example of a gradation mask per path, formed through linefeed.

FIG. 13 is a diagram for explaining an example of gradation mask per path, formed through linefeed.

As illustrated in FIG. 13, in a case of multipath interlace in which scanning is performed through linefeed, in a sub-scanning direction, each gradation area (setting area) may have a width of a product of an integer of a line pitch in the scanning of the carriage 200. In the example of FIG. 13, for example, a width of each gradation area in which image density is gradually decreased toward a given end portion of a gradation mask, is twice as great as one line pitch.

In such a manner, for each path, scanning is performed through linefeed, and in a sub-scanning direction, a scan area in which a print head scans to form an image, is divided into blocks in accordance with the total number of paths. As a result, blocks used with multiple paths overlap to form complementary images. Each edge portion of a gradation mask that a print head or a head array forms, corresponds to a joint between adjacent blocks, and at the joint, different gradation curves are marked. Thereby, images formed with a first path and the last path are complementary to each other to obscure a boundary between the images.

As described above, scanning of a print head allows for divided blocks, and different blocks are complementary to each other.

Specifically, in a case of print sequences for multipath interlace (FIG. 7C through 7H), in a sub-scanning direction, a gradation mask is divided into blocks where an image is formed. For example, while moving in a sub-scanning direction through linefeed, a carriage moves in a main scanning direction to form an image. In this case, images formed with multiple scans are complementary to each other to form a given print image.

In this case, multiple boundaries between adjacent blocks are dispersedly present, and glossy banding can be thereby avoided. Specific manners of gradation masks in each of which multiple blocks are used with multiple paths will be described below with reference to FIGS. 15, 17, and 19.

<Gradation Mask Operation>

Figure 14:
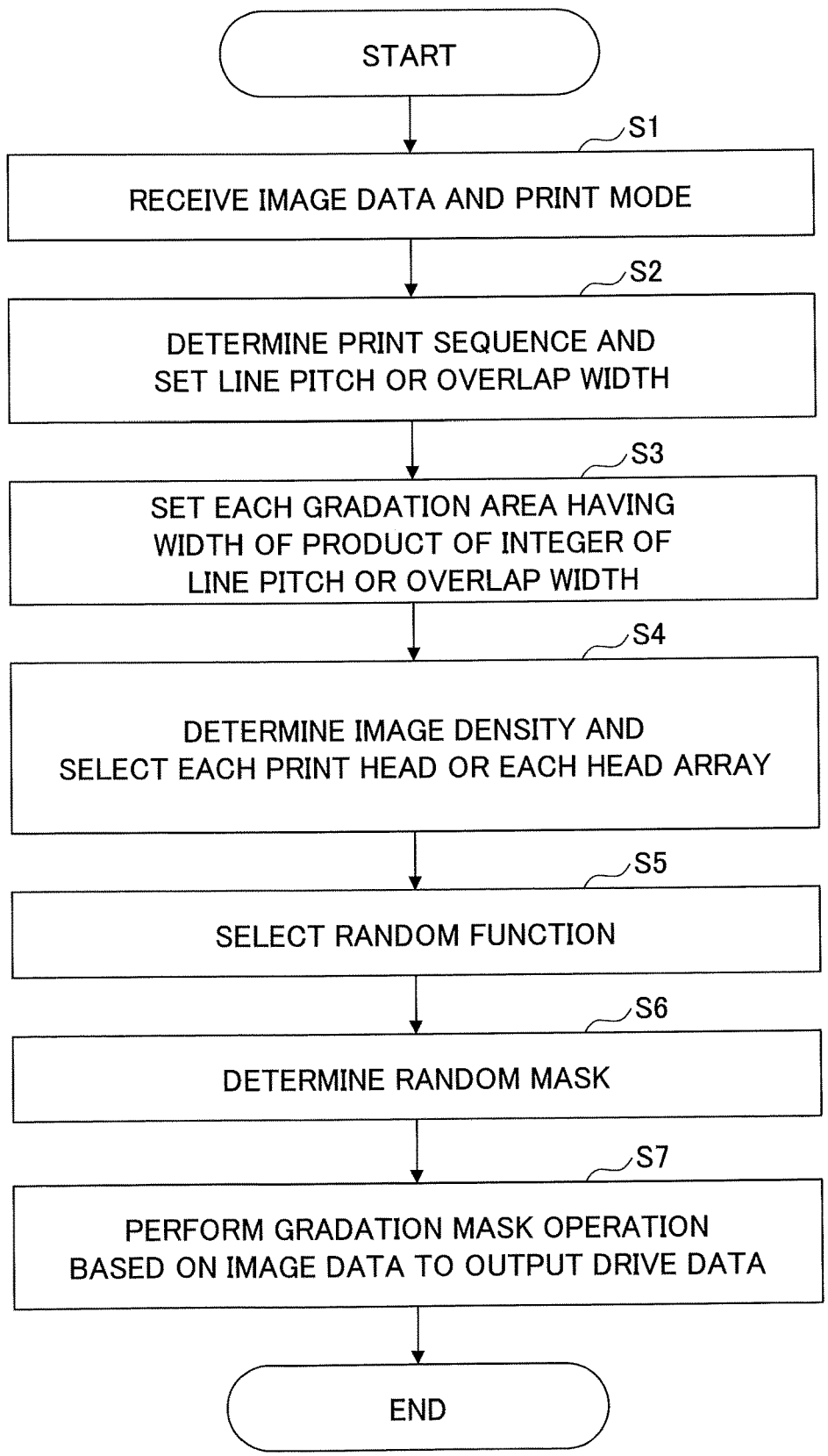
FIG. 14 is a flowchart illustrating an example of gradation mask operation according to one embodiment.

FIG. 14 is a flowchart illustrating an example of gradation mask operation according to the present embodiment.

In step S1, image data and a print mode are received. For example, the print mode includes a print speed, an image type (text, illustration, or photograph), a resolution (high resolution or low resolution), and the like.

In step S2, a print sequence is determined based on the print mode and the image data, and a line pitch or an overlap width is set.

In step S3, gradation areas each of which has a width of: a product of an integer of the line pitch; or a product of an integer of the overlap width, are set, where the line pitch or the overlap width is set in step S2.

In step S4, image density is determined. Further, each print head or each head array is selected as a component that forms a gradation mask with two gradation areas.

In step S5, one or more random functions used in a given gradation mask are selected. For example, one function may be selected from among multiple random functions that include a function that allows for a random pattern as illustrated in FIG. 11. Alternatively, a predetermined random function may be used.

In step S6, with respect to end portions of a given gradation mask formed by a given component selected in step S4, four gradation curves and a random mask in which the random function selected in step S5 is used, are determined.

Note that in this flow, step S2 at which the print sequence is determined, step S3 at which each gradation area is set, and step S4 at which the component that forms the gradation mask with two gradation areas, are taken in this order. However, this order may be reversed, or, steps S3 through S5 may be taken simultaneously.

In step S7, gradation mask operation is performed based on image data, and then drive data is transmitted to a recording unit (head driver) 14.

An image having an actually formed gradation mask is formed on a print medium, and then gloss of the image is detected by a gloss detector (not illustrated). Thereby, a detected result may be used for feedback control.

As described above, in each gradation area, image density varies in accordance with a product of an integer of a line pitch or an overlap width. Thereby, images formed with multiple paths are complementarily formed, and a density unevenness can be prevented as well as glossy banding.

Note that the gradation mask operation may be performed by an image forming apparatus 30 or an image processing apparatus 12 connected to the image forming apparatus.

One or more embodiments provide the following three manners of forming a gradation mask in which the gradation curves described above are marked.

When a print head unit is a single print head that discharges different colored inks, the print head is used to form a gradation mask with gradation areas.

When a print head unit is a head array with multiple print heads, the head array is used to form a gradation mask with gradation areas, or, each print head is used to form a gradation mask with gradation areas.

<First Manner of Forming Gradation Mask>

First, an example of gradation mask formed by one print head will be described with reference to FIG. 15.

Figure 15:
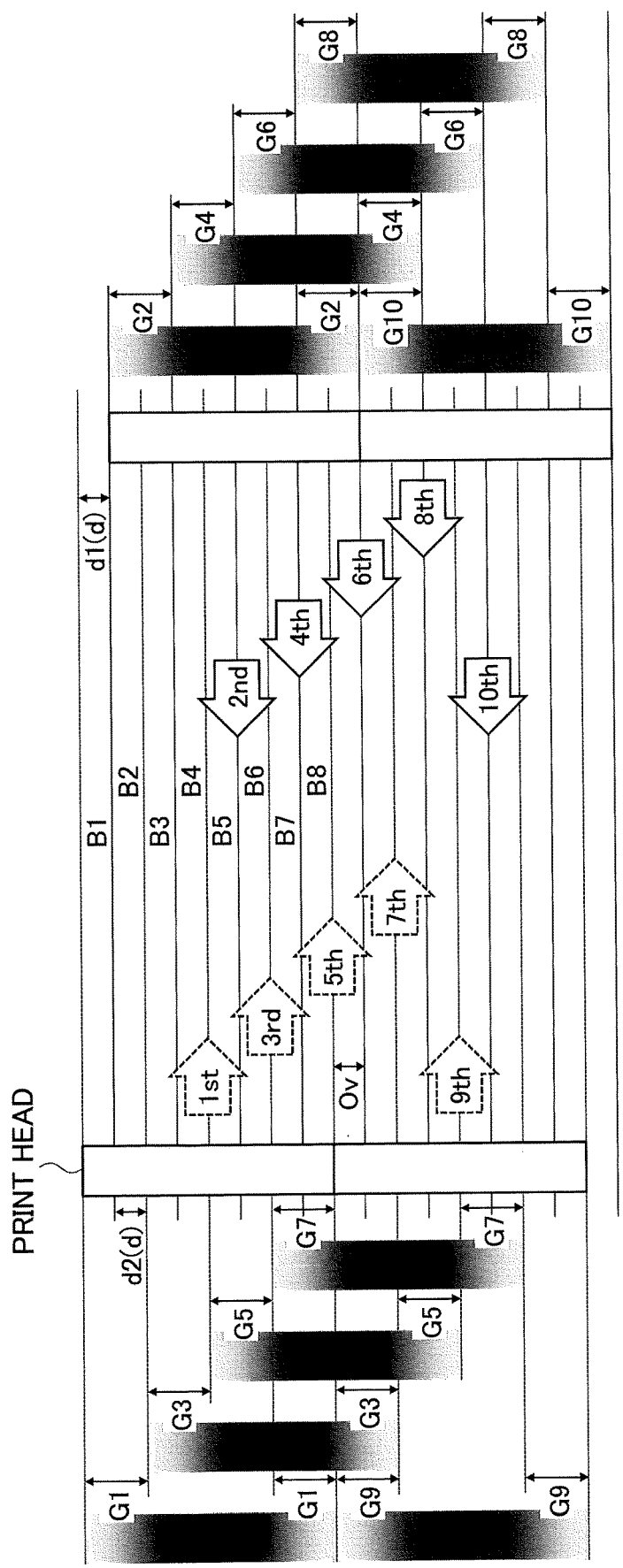
FIG. 15 is a diagram for explaining an example of a print sequence in which one print head scans 8 times to form a gradation mask in one image formation area.

FIG. 15 is a diagram for explaining an example of a print sequence in which one print head scans 8 times to form a gradation mask in an image formation area.

As illustrated in FIG. 15, in a print sequence in which scanning is performed to form an image, the image is formed in one formation image area, with 8 scans. In this case, the print sequence is taken as 4 paths-1/2 interlace as illustrated in FIG. 7F, or 2 paths-1/4 interlace as illustrated in FIG. 7G. Alternatively, the print sequence may be taken as 8 paths-1/1 interlace, or 1 path-1/8 interlace, which is not illustrated.

In this case, in a sub-scanning direction, a line pitch d1 with respect to a given forward pathway (1st, 3rd, 5th, or 7th scan) and a given backward pathway (2nd, 4th, 6th, or 8th scan), as well as a line pitch d2 with respect to a given backward pathway (2nd, 4th, 6th, or 8th scan) and a given forward pathway (2nd, 4th, 6th, or 8th scan), are each set as "d".

In FIG. 15, in a sub-scanning direction, an overlap width (Ov) is a width of an overlap area between a given scan area (8th scan) and the next scan area (9th scan), with respect to gradation areas G8 and G9. In this example, a line pitch d is equal to the overlap width (Ov).

In the print sequence in FIG. 15, in a sub-scanning direction, each gradation area has a width of a product of an integer of the line pitch d (d1=d2=Ov). For example, in FIG. 15, the width of each of gradation areas G1 through G10 is twice as great as the line pitch d.

Note that in FIG. 15, with a reference to a given scan area (1st scan), first through eighth blocks (blocks B1 through B8) are defined in this order.

In the 1st scan area where the print head scans first, a first block B1 includes one gradation area G1, and a second block B2 includes gradation areas G1 and G2. A third block B3 includes gradation areas G2 and G3, and a fourth block B4 includes gradation areas G3 and G4. A fifth block B5 includes gradation areas G4 and G5, and a sixth block B6 includes gradation areas G4 and G5. A seventh block B7 includes gradation areas G6 and G7, and an eighth block B8 includes gradation areas G7 and G8. In such a manner, each of the blocks B2 through B8 includes the gradation areas that overlap each other.

As described above, the width of each gradation area is twice as great as the line pitch d, and a given gradation area approximately overlaps with a sequence gradation area, except for the first block B1. Thereby, in the gradation areas G1 through G8, respective gradations are shifted to be provided. Such gradations overlap partially.

In this case, in each gradation area, one or more gradation curves are complementarily marked, as described in FIGS. 12A and 12B. For this reason, in approximate all areas where an image is formed, given gradations overlap. In a gradation mask area where a gradation mask is formed, with a given print head, gradations are each provided in a strip pattern, in accordance with a product of a line pitch. In a sub-scanning direction, such gradations partially overlap and are complementary to each other. Thereby, image density can gradually vary regularly in a given gradation mask area.

In such a manner, even in a case of using a black ink with a combination of a plurality of colored inks, image density varies gradually. Thereby, height of a surface on which an image is formed changes gradually, after hardeners are applied. Accordingly, gloss is dispersed and thus glossy banding can be suppressed.

<Second Manner of Forming Gradation Mask>

Hereafter, a manner of using a head array with multiple print heads will be described with reference to FIGS. 16 and 17.

Figure 16:
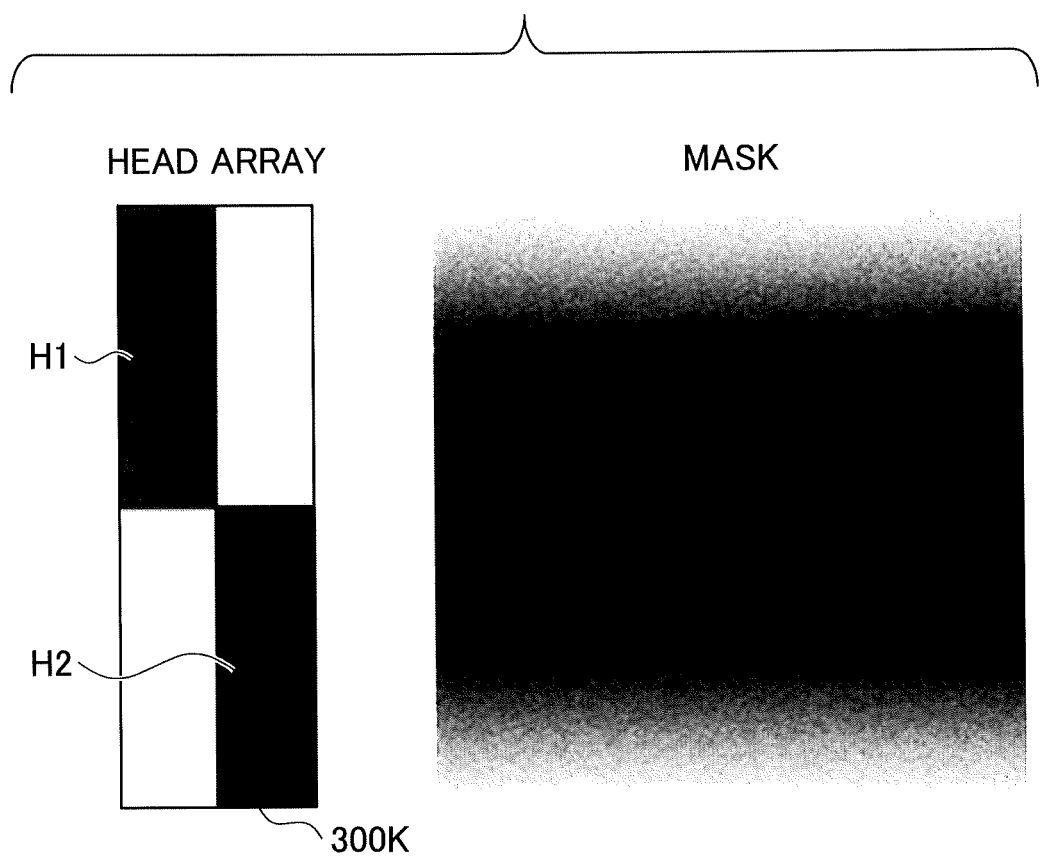
FIG. 16 is a diagram illustrating an example of a gradation mask that a head array with two heads forms.

FIG. 16 is a diagram illustrating an example of a gradation mask that a head array with two print heads forms.

As illustrated in FIG. 16, a head array 300K includes a plurality of print heads H1 and H2 each of which has a nozzle array. During scanning, both end portions of the nozzle array shift to different scan area.

In gradation mask operation, a masking unit, which is served by the gradation-area setting unit 28C and the selecting unit 28D, functions to allow for a gradation mask that includes gradation areas in a sub-scanning direction of the head array.

Figure 17:
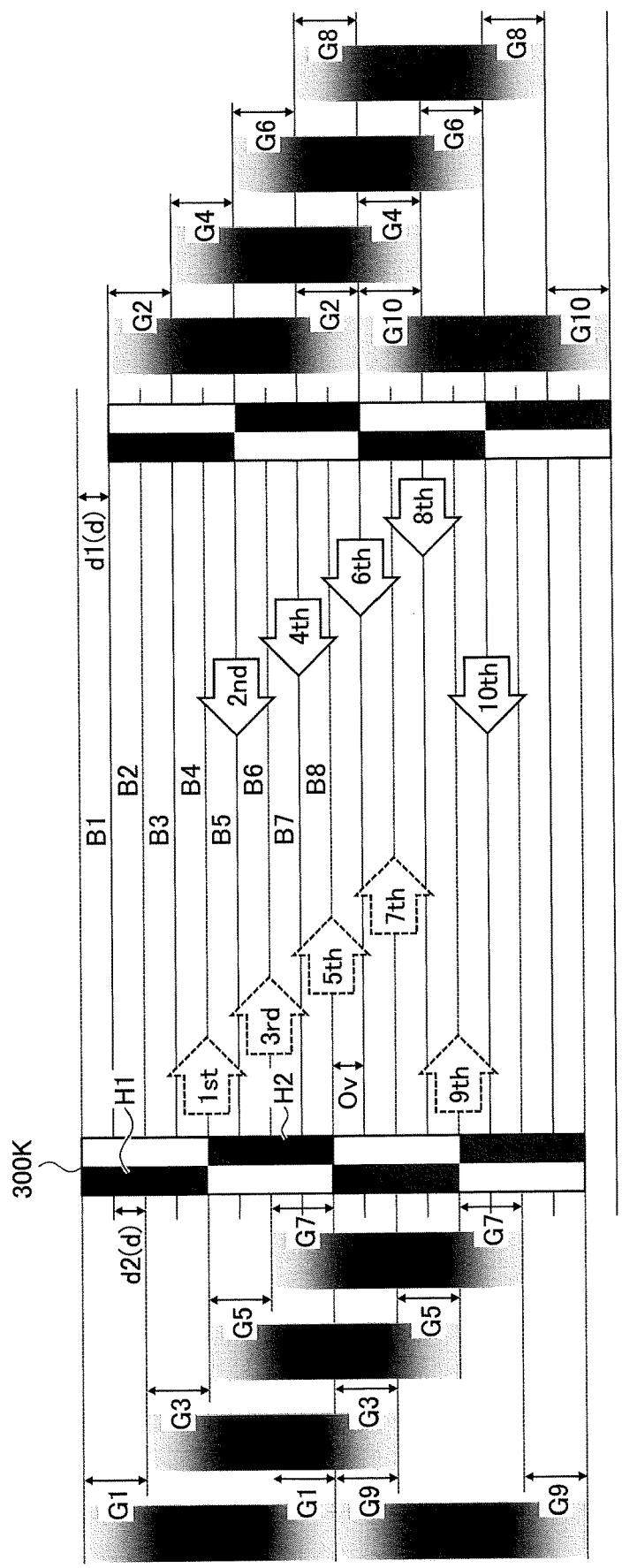
FIG. 17 is a diagram for explaining an example of a print sequence in which a head array with two print heads scans 8 times to form a gradation mask in one image formation area.

FIG. 17 is a diagram for explaining an example of a print sequence in which a head array 300K with two print heads H1 and H2 scans 8 times to form a gradation mask in one image formation area. The gradation mask in FIG. 17 is similar to the gradation mask that one print head forms, as illustrated in FIG. 15.

In the print sequence in FIG. 17, in a sub-scanning direction, a width of a gradation mask area is twice (a product of an integer) as great as a line pitch d1 (=d2=Ov) with respect to a forward pathway and a backward pathway.

In this case as well, as in the case of FIG. 15, in each gradation area in a gradation mask, one or more gradation curves are complementarily marked as described in FIGS. 12A and 12B, in accordance with a product of a line pitch or an overlap width. For this reason, in scan areas where an image is formed, given gradations overlap and are complementary to each other. Thereby, image density can gradually vary regularly in the whole image formation area. Even in a case of using a black ink with a combination of a plurality of colored inks, image density varies gradually, and height of a surface on which an image is formed changes gradually, after hardeners are applied. Thereby, gloss is dispersed, and thus glossy banding can be suppressed.

Note that, in a case of printing an image that has relatively high density, as illustrated in FIGS. 16 and 17, a head array having a plurality of print heads may be used to provide gradations in both end portions of a gradation mask.

<Third Manner of Forming Gradation Mask>

Hereafter, a manner of using each print head of a head array will be described with reference to FIGS. 18 and 19.

Figure 18:
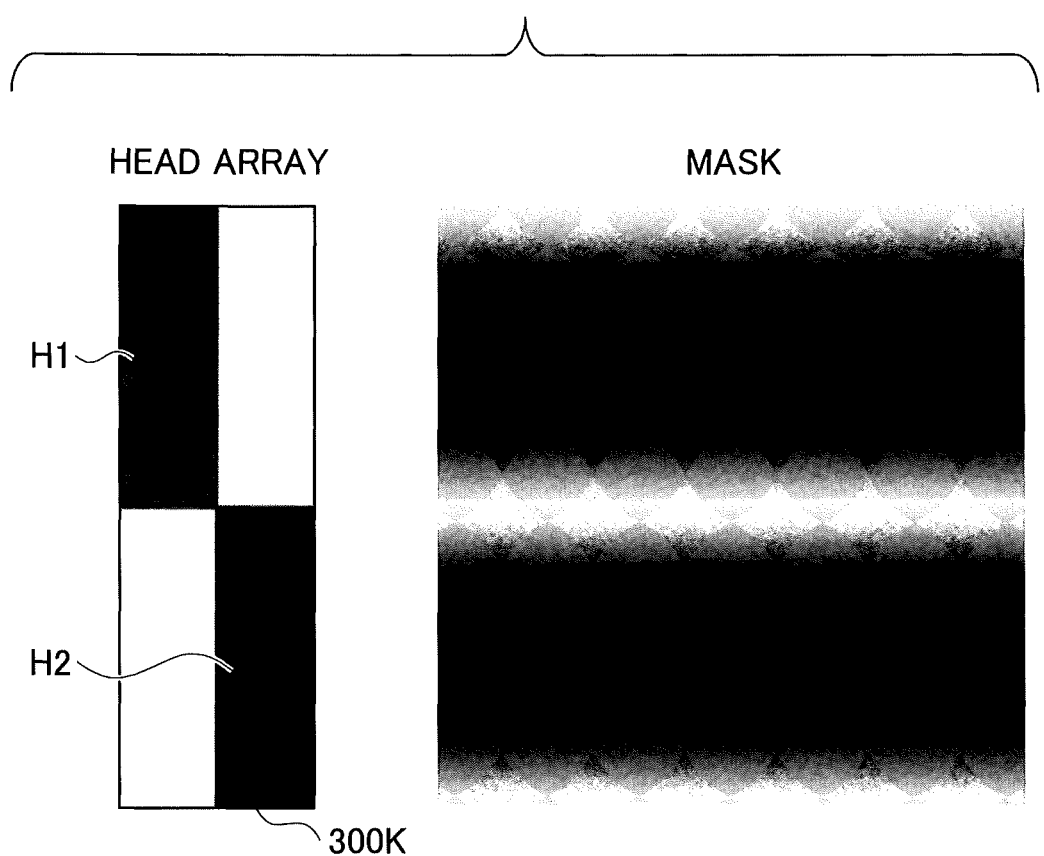
FIG. 18 is a diagram for explaining an example of gradation masks that respective two print heads of a head array form.

FIG. 18 is a diagram for explaining an example of gradation masks that respective two print heads form.

As illustrated in FIG. 18, a head array 300K has a same configuration as the head array in FIG. 16. In this example, in gradation mask operation, a masking unit, which is served by the gradation-area setting unit 28C and the selecting unit 28D, functions to allow for a gradation mask that includes gradation areas in a sub-scanning direction of each of print heads H1 and H2 of the head array.

Figure 19:
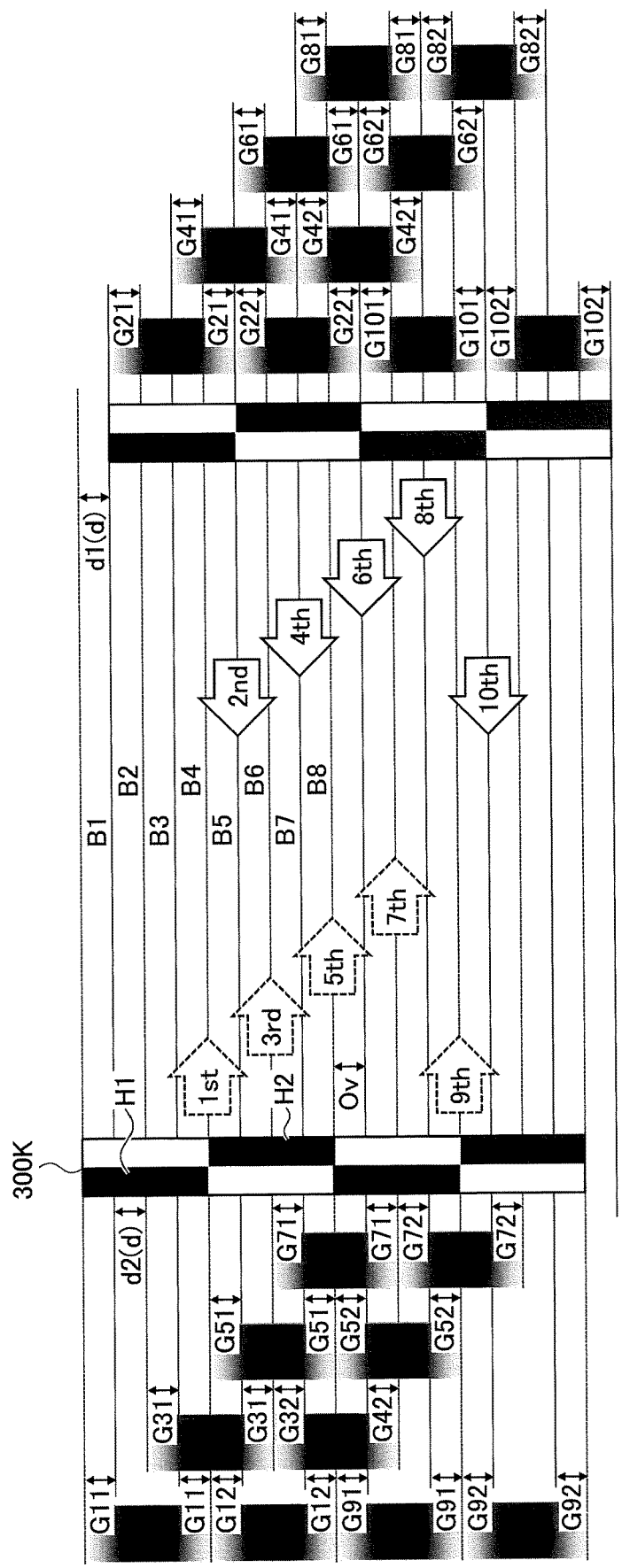
FIG. 19 is a diagram of a print sequence in which each head of a head array scans 8 times to form a given gradation mask in one image formation area.

FIG. 19 is a diagram of a print sequence in which each print head of a head array scans 8 times to form a given gradation mask in one image formation area.

In the example of FIG. 19, in a sub-scanning direction, a line pitch d1 with respect to a given forward pathway (1st, 3rd, 5th, or 7th scan) and a given backward pathway (2nd, 4th, 6th, or 8th scan), as well as a line pitch d2 with respect to a given backward pathway (2nd, 4th, 6th, or 8th scan) and a given forward pathway (2nd, 4th, 6th, or 8th scan), are each set as "d".

Also, in a sub-scanning direction, an overlap width (Ov) indicates a width of an overlap area between a given scan area (8th scan) and the next scan area (9th scan). In this example, a line pitch d is equal to the overlap width (Ov).

In the example of the print sequence illustrated in FIG. 19, a width of each gradation area is set to be equal to the line pitch d.

As illustrated in FIG. 19, in a given scan area in which a given one head array moves, a given one print head scans 8 times, i.e., four rounds. With a reference to a given scan area (1st scan), first through eighth blocks (blocks B1 through B8) are defined in this order.

For the head array 300K, blocks B1, B2, B3, and B4 respectively include gradation areas G11, G21, G31, and G41. Blocks B5, B6, B7, and B8 respectively include two gradation areas (G12 and G51), (G22 and G61), (G32, G71), and (G42, G81). After the 5th scan, in gradation areas, gradations are shifted to overlap partially.

In this case, in each gradation area, gradation curves that are complementary to each other are marked as illustrated in FIGS. 12A and 12B. With each print head, gradations are provided in a strip pattern, in accordance with a product of a line pitch. Such gradations partially overlap and are complementary to each other. Thereby, image density can be uniform in the whole mask area.

Even in a case of using a black ink with a combination of a plurality of colored inks, image density is uniform and glossy banding can be suppressed.

Further, as illustrated in FIGS. 18 and 19, in a case of a head array with multiple print heads, each print head is used to form a gradation mask. In this case, the number of gradation areas is increased, compared to a case of using a head array as illustrated in FIG. 16. The number of times in which gradations are provided is thereby increased. For this reason, image density further varies gradually in a given image formation area, and height of a surface on which an image is formed changes gradually, after hardeners are applied. Thereby, gloss is dispersed, and thus glossy banding can be suppressed.

In light of the point described above, in order to print an image that has relatively high density, each print head of a head array may be used.

A difference in a shape of a print surface may result in glossy banding. The glossy banding is more likely to occur when image density is increased. When image density is increased, in a case of using each head array to form a gradation mask, glossy banding can be effectively avoided. Also, glossy banding may occur due to a difference in an adhered amount of ink per unit area; or variation of an adhered amount of ink. For this reason, the glossy banding is more likely to occur when image density is decreased. When image density is decreased, in a case of using each print head to form a gradation mask, glossy banding can be effectively avoided.

Note that in a case of a head array with multiple print heads, the head array or each print head is suitably selected in consideration of ink color; ink type; and a print medium type, as well as image density.

In FIGS. 16 through 19, during scanning, both end portions of a nozzle array in a given head shift to a different scan area. However, such head arrays may be changed.

As described above, in one or more embodiments, with a product of an integer of a line pitch or an overlap width being defined, point-symmetric gradation curves as illustrated in FIG. 9B are marked. Thereby, glossy banding with respect to black ink can be avoided even in a formation mode in which productivity is increased.

One or more embodiments have been described. However, the present disclosure is not limited to the above embodiments, and various modifications and modifications can be made within the scope of the present disclosure.

The present disclosure provides a method for discharging liquid including:

moving a print head unit in a scanning direction perpendicular to a sub-scanning direction with respect to a print medium, while causing discharge of liquid onto the print medium, the print head unit including a nozzle array with a plurality of nozzles, in a sub-scanning direction, each nozzle being configured to discharge liquid onto the print medium;

moving, without causing discharge of the liquid, the print medium or the print head unit in the sub-scanning direction, moving of the print head unit in the scanning direction and moving of the print medium or the print head unit in the sub-scanning direction being alternately performed; and setting a line pitch by which the print head unit moves, per scan with respect to the sub-scanning direction;

performing a gradation mask operation in which, in the sub-scanning direction, the number of dots of liquid discharged from the nozzles is decreased toward both end portions, as gradation areas, of a gradation mask formed through the print head unit, the both end portions of the gradation mask corresponding to both end portions of the print head unit;

causing the nozzles of the print head unit to discharge liquid based on image data, wherein the gradation mask operation is performed using a combination of four gradation curve functions and a random function for randomly arranged dots, the four gradation curve functions being a first gradation curve function, a second gradation curve function, a third gradation curve function, and a fourth gradation curve function, wherein a first combination of a first gradation curve marked through the first gradation curve function and a second gradation curve marked through the second curve function is marked in a first end portion of the gradation mask, among the both end portions, and a second combination of a third gradation curve marked through the third gradation curve function and a fourth gradation curve marked through the fourth gradation curve function is marked in a second end portion of the gradation mask, wherein the first gradation curve and the second gradation curve are point-symmetric about a point that is a midpoint of the first end portion of the gradation mask, and wherein the third gradation curve and the fourth gradation curve are point-symmetric about a point that is a midpoint of the second end portion of the gradation mask, wherein, in the sub-scanning direction, a combination of the first gradation curve and the third gradation curve are line-symmetric with respect to a point that is a midpoint of the plurality of nozzles of the nozzle array in the print head unit, and wherein, in the sub-scanning direction, a combination of the second gradation curve and the fourth gradation curve are line-symmetric with respect to a point that is a midpoint of the plurality of nozzles of the nozzle array in the print head unit, and wherein, in the sub-scanning direction, each gradation area of the gradation mask has a width of a product of an integer of the line pitch.

The present disclosure provides a non-transitory recording medium storing a program that, when executed by a computer, causes the computer to execute a method, the method including:

moving a print head unit in a scanning direction perpendicular to a sub-scanning direction with respect to a print medium, while causing discharge of liquid onto the print medium, the print head unit including a nozzle array with a plurality of nozzles in a sub-scanning direction, each nozzle being configured to discharge liquid onto the print medium;

moving, without causing discharge of the liquid, the print medium or the print head unit in the sub-scanning direction, moving of the print head unit in the scanning direction and moving of the print medium or the print head unit in the sub-scanning direction being alternately performed; and setting a line pitch by which the print head unit moves, per scan with respect to the sub-scanning direction;

performing a gradation mask operation in which, in the sub-scanning direction, the number of dots of liquid discharged from the nozzles is decreased toward both end portions, as gradation areas, of a gradation mask formed through the print head unit, the both end portions of the gradation mask corresponding to both end portions of the print head unit;

causing the nozzles of the print head unit to discharge liquid based on image data, wherein the gradation mask operation is performed using a combination of four gradation curve functions and a random function for randomly arranged dots, the four gradation curve functions being a first gradation curve function, a second gradation curve function, a third gradation curve function, and a fourth gradation curve function, wherein a first combination of a first gradation curve marked through the first gradation curve function and a second gradation curve marked through the second curve function is marked in a first end portion of the gradation mask, among the both end portions, and a second combination of a third gradation curve marked through the third gradation curve function and a fourth gradation curve marked through the fourth gradation curve function is marked in a second end portion of the gradation mask, wherein the first gradation curve and the second gradation curve are point-symmetric about a point that is a midpoint of the first end portion of the gradation mask, and wherein the third gradation curve and the fourth gradation curve are point-symmetric about a point that is a midpoint of the second end portion of the gradation mask, wherein, in the sub-scanning direction, a combination of the first gradation curve and the third gradation curve are line-symmetric with respect to a point that is a midpoint of the plurality of nozzles of the nozzle array in the print head unit, and wherein, in the sub-scanning direction, a combination of the second gradation curve and the fourth gradation curve are line-symmetric with respect to a point that is a midpoint of the plurality of nozzles of the nozzle array in the print head unit, and wherein, in the sub-scanning direction, each gradation area of the gradation mask has a width of a product of an integer of the line pitch.

What is claimed is:

1. A liquid discharging apparatus comprising:
   a print head unit including a nozzle array with a plurality of nozzles in a sub-scanning direction, each nozzle being configured to discharge liquid onto a print medium, and the print head unit being either a head array with a plurality of heads or any one of the plurality of heads;
   a moving unit configured to:
     move the print head unit in a scanning direction perpendicular to the sub-scanning direction with respect to the print medium, while causing discharge of the liquid onto the print medium; and
     move, without causing discharge of the liquid, the print medium or the print head unit in the sub-scanning direction, moving of the print head unit in the scanning direction and moving of the print medium or the print head unit in the sub-scanning direction being alternately performed; and
   a line-pitch setting unit configured to set a line pitch by which the print head unit moves, per scan with respect to the sub-scanning direction;
   a masking unit configured to perform a gradation mask operation in which, in the sub-scanning direction, the number of dots of liquid discharged from the nozzles is decreased toward both end portions, as gradation areas, of a gradation mask formed through the print head unit, the both end portions of the gradation mask corresponding to both end portions of the print head unit;
   a head driver configured to cause the nozzles of the print head unit to discharge liquid based on image data;
   a processor configured to select, as the print head unit that is assigned to the gradation mask, either the head array or the one head, based on image density derived from the image data; and
   a detector configured to detect a gloss of an image that is formed on the print medium by assigning the selected print head unit to the gradation mask and to enable feedback control in the gradation mask operation, based on a detected result,
   wherein the gradation mask operation is performed using a combination of four gradation curve functions and a random function for randomly arranged dots, the four gradation curve functions being a first gradation curve function, a second gradation curve function, a third gradation curve function, and a fourth gradation curve function, wherein a first combination of a first gradation curve marked through the first gradation curve function and a second gradation curve marked through the second curve function is marked in a first end portion of the gradation mask, among the both end portions, and a second combination of a third gradation curve marked through the third gradation curve function and a fourth gradation curve marked through the fourth gradation curve function is marked in a second end portion of the gradation mask,
   wherein the first gradation curve and the second gradation curve are point-symmetric about a point that is a midpoint of the first end portion of the gradation mask, and wherein the third gradation curve and the fourth gradation curve are point-symmetric about a point that is a midpoint of the second end portion of the gradation mask,
   wherein, in the sub-scanning direction, a combination of the first gradation curve and the third gradation curve are line-symmetric with respect to a point that is a midpoint of the plurality of nozzles of the nozzle array in the print head unit, and wherein, in the sub scanning direction, a combination of the second gradation curve and the fourth gradation curve are line-symmetric with respect to a point that is a midpoint of the plurality of nozzles of the nozzle array in the print head unit,
   wherein, in the sub-scanning direction, each gradation area of the gradation mask has a width of an integer multiple of the line pitch, and
   wherein the print head unit is configured to discharge the liquid onto the print medium, at an offset by the line pitch, such that same gradation areas of the gradation mask partially overlap with respect to continuous forward scanning and backward scanning in the scanning direction.

2. The liquid discharging apparatus according to claim 1, wherein the line-pitch setting unit is configured to set the line pitch according to a print sequence in which scanning is performed with respect to the scanning direction and the sub-scanning direction.

3. The liquid discharging apparatus according to claim 1, wherein the random function causes dots to be dispersed.

4. The liquid discharging apparatus according to claim 1, wherein the print head unit is configured to form respective given images in a plurality of blocks of a formation image area where a print image is formed based on the given images, the blocks being disposed in the sub-scanning direction and the scanning direction, and the given images being complementary to each other.

5. The liquid discharging apparatus according to claim 1, wherein the print head unit is a head array having multiple print heads each of which includes the nozzle array, and
wherein the masking unit is configured to perform the gradation mask operation in which the head array forms a gradation mask, the gradation mask including gradation areas formed through both end portions of the head array.

6. The liquid discharging apparatus according to claim 1, wherein the masking unit is configured to perform, upon occurrence of a condition in which the one head is selected as the print head unit, the gradation mask operation in which the one head forms the gradation mask that includes gradation areas formed through both end portions of the one head.

7. The liquid discharging apparatus according to claim 1, wherein the processor is configured to determine whether the image density derived from the image data is less than predetermined image density, and to select, as the one print head unit that is assigned to the gradation mask, either the head array or the one head, based on whether the image density derived from the image data is less than the predetermined image density.

8. A method for discharging liquid comprising:
moving a print head unit in a scanning direction perpendicular to a sub-scanning direction with respect to a print medium, while causing discharge of liquid onto the print medium, the print head, unit including a nozzle array with a plurality of nozzles, in a sub scanning direction, each nozzle being configured to discharge liquid onto the print medium, and the print head unit being either a head array with a plurality of heads or any one of the plurality of heads;
moving, without causing discharge of the liquid, the print medium or the print head unit in the sub-scanning direction, moving of the print head unit in the scanning direction and moving of the print, medium or the print head unit in the sub-scanning direction being alternately performed;
setting a line pitch by which the print head unit moves, per scan with respect to the sub-scanning direction;
performing a gradation mask operation in which, in the sub-scanning direction, the number of dots of liquid discharged from the nozzles is decreased toward both end portions, as gradation areas, of a gradation mask formed through the print head unit, the both end portions of the gradation mask corresponding to both end portions of the print head unit;
causing the nozzles of the print head unit to discharge liquid based on image data;
selecting, as the print head unit that is assigned to the gradation mask, either the head array or the one head, based on image density derived from the image data; and
detecting a gloss of an image that is formed on the print medium by assigning the selected print head unit to the gradation mask and to enable feedback control in the gradation mask operation, based on a detected result,
wherein the gradation mask operation is performed using a combination of four gradation curve functions and a random function for randomly arranged dots, the four gradation curve functions being a first gradation curve function, a second gradation curve function, a third gradation curve function, and a fourth gradation curve function,
wherein a first combination of a first gradation curve marked through the first gradation curve function and a second gradation curve marked through the second curve function is marked in a first end portion of the gradation mask, among the both end portions, and a second combination of a third gradation curve marked through the third gradation curve function and a fourth gradation curve marked through the fourth gradation curve function is marked in a second end portion of the gradation mask,
wherein the first gradation curve and the second gradation curve are point-symmetric about a point that is a midpoint of the first end portion of the gradation mask, and wherein the third gradation curve and the fourth gradation curve are point-symmetric about a point that is a midpoint of the second end portion of the gradation mask,
wherein, in the sub-scanning direction, a combination of the first gradation curve and the third gradation curve are line-symmetric with respect to a point that is a midpoint of the plurality of nozzles of the nozzle array in the print head unit, and wherein, in the sub-scanning direction, a combination of the second gradation curve and the fourth gradation curve are, line-symmetric with respect to a point that is a midpoint of the plurality of nozzles of the nozzle array in the print head unit,
wherein, in the sub-scanning direction, each gradation area of the gradation mask has a width of an integer multiple of the line pitch, and
wherein the causing discharge of liquid onto the print medium includes causing the print head to discharge the liquid onto the print medium, at an offset by the line pitch, such that same gradation areas of the gradation mask partially overlap with respect to continuous forward scanning and backward scanning in the scanning direction.

9. A non-transitory recording medium storing a program that, when executed by a computer, causes the computer to execute a method, the method comprising:
moving a print head unit in a scanning direction perpendicular to a sub-scanning direction with respect to a print medium, while causing discharge of liquid onto the print medium, the print head unit including a nozzle array with a plurality of nozzles in a sub-scanning direction, each nozzle being configured to discharge liquid onto the print medium, and the print head unit being either a head array with a plurality of heads or any one of the plurality of heads;
moving, without causing discharge of the liquid, the print medium or the print head unit in the sub-scanning direction, moving of the print head unit in the scanning direction and moving of the print medium or the print head unit in the sub-scanning direction being, alternately performed;
setting a line pitch by which the print head unit moves, per scan with respect to the sub-scanning direction;
performing a gradation mask operation in which, in the sub-scanning direction, the number of dots of liquid discharged from the nozzles is decreased toward both end portions, as gradation areas, of a gradation mask formed through the print head unit, the both end portions of the gradation mask corresponding to both end portions of the print head unit; causing the nozzles of the print head unit to discharge liquid based on image data;
selecting, as the print head unit that is assigned to the gradation mask, either the head array or the one head, based on image density derived from the image data; and detecting a gloss of an image that is formed on the print medium by assigning the selected print head unit to the gradation mask and to enable feedback control in the gradation mask operation, based on a detected result, wherein the gradation mask operation is performed using a combination of four gradation curve functions and a random function for randomly arranged dots, the four gradation curve functions being a first gradation curve function, a second gradation curve function, a third gradation curve function, and a fourth gradation curve function, wherein a first combination of a first gradation curve marked through the first gradation curve function and a second gradation curve marked through the second curve function is marked in a first end portion of the gradation mask, among the both end portions, and a second, combination of a third gradation curve marked through the third gradation curve function and a fourth gradation curve marked through the fourth gradation curve function is marked in a second end portion of the gradation mask, wherein the first gradation curve and the second gradation curve are point-symmetric about a point that is a midpoint of the first end portion of the gradation, mask, and wherein the third gradation curve and the fourth gradation curve are point-symmetric about a point that is a midpoint of the second end portion of the gradation mask, wherein, in the sub-scanning direction, a combination of the first gradation curve and the third gradation curve are line-symmetric with respect to a point that is a midpoint of the plurality of nozzles of the nozzle array in the print head unit, and wherein, in the sib scanning direction, a combination of the second gradation curve and the fourth gradation curve are line-symmetric with respect to a point that is a midpoint of the plurality of nozzles of the nozzle array in the print head unit, wherein, in the sub-scanning direction, each gradation area of the gradation mask has a width of an integer multiple of the line pitch, and wherein the causing discharge of liquid onto the print medium includes causing the print head to discharge the liquid onto the print medium, at an offset by the line pitch, such that same gradation areas of the gradation mask partially overlap with respect to continuous forward scanning and backward scanning in the scanning direction.

\* \* \* \* \*